(12) United States Patent
Dallal et al.

(10) Patent No.: US 11,483,037 B2
(45) Date of Patent: Oct. 25, 2022

(54) CONFIGURABLE DEFLECTION MEASUREMENT AND REPORTING

(71) Applicant: QUALCOMM Incorporated, San Diego, CA (US)

(72) Inventors: Yehonatan Dallal, Kfar Saba (IL); Ran Berliner, Kfar-Aviv (IL); Shay Landis, Hod Hasharon (IL)

(73) Assignee: QUALCOMM incorporated, San Diego, CA (US)

(*) Notice: Subject to any disclaimer, the term of this patent is extended or adjusted under 35 U.S.C. 154(b) by 0 days.

(21) Appl. No.: 17/475,156

(22) Filed: Sep. 14, 2021

(65) Prior Publication Data

US 2022/0085850 A1 Mar. 17, 2022

Related U.S. Application Data

(60) Provisional application No. 63/079,166, filed on Sep. 16, 2020.

(51) Int. Cl.
*H04B 7/0426* (2017.01)
*H04B 7/06* (2006.01)
*H04W 24/10* (2009.01)
*H04L 5/00* (2006.01)

(52) U.S. Cl.
CPC ........... *H04B 7/043* (2013.01); *H04B 7/0617* (2013.01); *H04L 5/0048* (2013.01); *H04W 24/10* (2013.01)

(58) Field of Classification Search
CPC ..... H04B 7/043; H04B 7/0617; H04L 5/0048; H04W 24/10; H04W 24/02
See application file for complete search history.

(56) References Cited

U.S. PATENT DOCUMENTS

| 9,844,077 | B1* | 12/2017 | Sung | H04W 72/046 |
| 2002/0196186 | A1* | 12/2002 | Holt | G01S 5/0252 342/453 |
| 2016/0165548 | A1* | 6/2016 | Mohlmann | H04B 7/155 455/522 |

\* cited by examiner

*Primary Examiner* — Vineeta S Panwalkar
(74) *Attorney, Agent, or Firm* — Danai Nelisile Mhembere; Holland & Hart LLP

(57) ABSTRACT

Methods, systems, and devices for wireless communications are described. A channel engineering device may receive control signaling that triggers the channel engineering device to perform one or more angle of arrival (AoA) measurements on one or more reference signals and transmit an AoA measurement report based on the AoA measurements. The base station may process the AoA measurement report and send a control message that configures one or more settings at the channel engineering device. The base station may determine a beam shaping configuration that modifies the one or more settings at the channel engineering device to reflect, focus, refract, or filter signal energy of a transmission by the base station toward a user equipment (UE), a transmission by the UE toward the base station, or both. The base station and one or more UEs may communicate using the channel engineering device based on the beam shaping configuration.

30 Claims, 16 Drawing Sheets

Control Signaling 315

Reference Signal 325

AoA Measurement Report 335

Beam Shaping Configuration 305

CONFIGURABLE DEFLECTION MEASUREMENT AND REPORTING

CROSS REFERENCE

The present application for patent claims the benefit of U.S. Provisional Patent Application No. 63/079,166 by DALLAL et al., entitled "CONFIGURABLE DEFLECTION MEASUREMENT AND REPORTING," filed Sep. 16, 2020, assigned to the assignee hereof, and expressly incorporated by reference herein.

FIELD OF TECHNOLOGY

The following relates to wireless communications, including configurable deflection measurement and reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support configurable deflection measurement and reporting. Generally, the described techniques provide for a base station to configure a channel engineering device with a beam shaping configuration for shaping received signal energy toward a base station, one or more user equipments (UEs), or both. For example, the channel engineering device may receive control signaling from a base station that triggers the channel engineering device to perform one or more angle of arrival (AoA) measurements on one or more reference signals. The channel engineering device may receive one or more reference signals from the base station, one or more UEs, or both. The channel engineering device may transmit an AoA measurement report based on the AoA measurements. The base station may process the AoA measurement report and send a control message that configures one or more settings at the channel engineering device. In some cases, the base station may determine a beam shaping configuration that modifies the one or more settings at the channel engineering device to adjust an electronic metamaterial to reflect, focus, refract, or filter signal energy of a transmission by the base station toward the UE, a transmission by the UE toward the base station, or both. In some cases, the base station and one or more UEs may communicate using the channel engineering device based on the beam shaping configuration.

A method of wireless communications at a channel engineering device is described. The method may include receiving, from a base station, control signaling triggering the channel engineering device to perform a first AoA measurement for a first reference signal transmission by the base station and a second AoA measurement for a second reference signal transmission by a UE, transmitting, based on the control signaling, at least one AoA measurement report that indicates the first AoA measurement, the second AoA measurement, or both, and receiving a control message that indicates a beam shaping configuration based on the at least one AoA measurement report.

An apparatus for wireless communications at a channel engineering device is described. The apparatus may include a processor, memory coupled with the processor, and instructions stored in the memory. The instructions may be executable by the processor to cause the apparatus to receive, from a base station, control signaling triggering the channel engineering device to perform a first AoA measurement for a first reference signal transmission by the base station and a second AoA measurement for a second reference signal transmission by a UE, transmit, based on the control signaling, at least one AoA measurement report that indicates the first AoA measurement, the second AoA measurement, or both, and receive a control message that indicates a beam shaping configuration based on the at least one AoA measurement report.

Another apparatus for wireless communications at a channel engineering device is described. The apparatus may include means for receiving, from a base station, control signaling triggering the channel engineering device to perform a first AoA measurement for a first reference signal transmission by the base station and a second AoA measurement for a second reference signal transmission by a UE, transmitting, based on the control signaling, at least one AoA measurement report that indicates the first AoA measurement, the second AoA measurement, or both, and receiving a control message that indicates a beam shaping configuration based on the at least one AoA measurement report.

A non-transitory computer-readable medium storing code for wireless communications at a channel engineering device is described. The code may include instructions executable by a processor to receive, from a base station, control signaling triggering the channel engineering device to perform a first AoA measurement for a first reference signal transmission by the base station and a second AoA measurement for a second reference signal transmission by a UE, transmit, based on the control signaling, at least one AoA measurement report that indicates the first AoA measurement, the second AoA measurement, or both, and receive a control message that indicates a beam shaping configuration based on the at least one AoA measurement report.

Some examples of the method, apparatuses, and non-transitory computer-readable medium described herein may further include operations, features, means, or instructions for receiving, from the base station, the first reference signal transmission based on the control signaling, and performing the first AoA measurement of the first reference signal transmission.

Some examples of the method, apparatuses, and non-transitory computer-readable medium described herein may further include operations, features, means, or instructions for receiving, from the UE, the second reference signal transmission based on the control signaling, and performing the second AoA measurement of the second reference signal transmission.

In some examples of the method, apparatuses, and non-transitory computer-readable medium described herein, transmitting the at least one AoA measurement report may include operations, features, means, or instructions for transmitting a first measurement report message indicating the first AoA measurement, and transmitting a second measurement report message indicating the second AoA measurement.

Some examples of the method, apparatuses, and non-transitory computer-readable medium described herein may further include operations, features, means, or instructions for receiving, from the base station, second control signaling triggering the channel engineering device to perform a third AoA measurement for a third reference signal transmission by the UE, transmitting, based on the second control signaling, a second AoA measurement report that indicates the third AoA measurement, and receiving a second control message that indicates an updated beam shaping configuration based on the second AoA measurement report.

In some examples of the method, apparatuses, and non-transitory computer-readable medium described herein, receiving the control signaling may include operations, features, means, or instructions for receiving the control signaling that configures the channel engineering device to monitor a reference signal transmission resource periodically or semi-statically for a subsequent reference signal transmission by the UE, and transmitting, based on the control signaling, an updated measurement reporting that indicates an updated AoA measurement for each subsequent reference signal transmission by the UE.

In some examples of the method, apparatuses, and non-transitory computer-readable medium described herein, the beam shaping configuration indicates one or more settings to adjust an electronic metamaterial of the channel engineering device to focus received signal energy, reflect received signal energy, refract received signal energy, filter received signal energy, or any combination thereof.

In some examples of the method, apparatuses, and non-transitory computer-readable medium described herein, the first reference signal transmission may be a channel state information reference signal (CSI-RS) and the second reference signal transmission may be a sounding reference signal (SRS) transmission.

A method of wireless communications at a base station is described. The method may include transmitting, to a channel engineering device, control signaling triggering the channel engineering device to perform a first AoA measurement for a first reference signal transmission by the base station and a second AoA measurement for a second reference signal transmission by a UE, receiving, based on the control signaling, at least one AoA measurement report that indicates the first AoA measurement, the second AoA measurement, or both, and transmitting, to the channel engineering device, a control message that indicates a beam shaping configuration based on the at least one AoA measurement report.

An apparatus for wireless communications at a base station is described. The apparatus may include a processor, memory coupled with the processor, and instructions stored in the memory. The instructions may be executable by the processor to cause the apparatus to transmit, to a channel engineering device, control signaling triggering the channel engineering device to perform a first AoA measurement for a first reference signal transmission by the base station and a second AoA measurement for a second reference signal transmission by a UE, receive, based on the control signaling, at least one AoA measurement report that indicates the first AoA measurement, the second AoA measurement, or both, and transmit, to the channel engineering device, a control message that indicates a beam shaping configuration based on the at least one AoA measurement report.

Another apparatus for wireless communications at a base station is described. The apparatus may include means for transmitting, to a channel engineering device, control signaling triggering the channel engineering device to perform a first AoA measurement for a first reference signal transmission by the base station and a second AoA measurement for a second reference signal transmission by a UE, receiving, based on the control signaling, at least one AoA measurement report that indicates the first AoA measurement, the second AoA measurement, or both, and transmitting, to the channel engineering device, a control message that indicates a beam shaping configuration based on the at least one AoA measurement report.

A non-transitory computer-readable medium storing code for wireless communications at a base station is described. The code may include instructions executable by a processor to transmit, to a channel engineering device, control signaling triggering the channel engineering device to perform a first AoA measurement for a first reference signal transmission by the base station and a second AoA measurement for a second reference signal transmission by a UE, receive, based on the control signaling, at least one AoA measurement report that indicates the first AoA measurement, the second AoA measurement, or both, and transmit, to the channel engineering device, a control message that indicates a beam shaping configuration based on the at least one AoA measurement report.

Some examples of the method, apparatuses, and non-transitory computer-readable medium described herein may further include operations, features, means, or instructions for transmitting, to the channel engineering device, the first reference signal transmission based on the control signaling.

In some examples of the method, apparatuses, and non-transitory computer-readable medium described herein, receiving the at least one AoA measurement report may include operations, features, means, or instructions for receiving a first measurement report message indicating the first AoA measurement, and receiving a second measurement report message indicating the second AoA measurement.

Some examples of the method, apparatuses, and non-transitory computer-readable medium described herein may further include operations, features, means, or instructions for transmitting, to the channel engineering device, second control signaling triggering the channel engineering device to perform a third AoA measurement for a third reference signal transmission by the UE, receiving, based on the second control signaling, a second AoA measurement report that indicates the third AoA measurement, and transmitting, to the channel engineering device, a second control message that indicates an updated beam shaping configuration based on the second AoA measurement report.

In some examples of the method, apparatuses, and non-transitory computer-readable medium described herein, transmitting the control signaling may include operations, features, means, or instructions for transmitting the control signaling that configures the channel engineering device to monitor a reference signal transmission resource periodically or semi-statically for a subsequent reference signal transmission by the UE.

Some examples of the method, apparatuses, and non-transitory computer-readable medium described herein may further include operations, features, means, or instructions for receiving, based on the control signaling, an updated measurement reporting that indicates an updated AoA measurement for each subsequent reference signal transmission by the UE.

In some examples of the method, apparatuses, and non-transitory computer-readable medium described herein, the beam shaping configuration indicates one or more settings to adjust an electronic metamaterial of the channel engineering device to focus received signal energy, reflect received signal energy, refract received signal energy, filter received signal energy, or any combination thereof.

In some examples of the method, apparatuses, and non-transitory computer-readable medium described herein, the first reference signal transmission may be a CSI-RS and the second reference signal transmission may be an SRS transmission.

DETAILED DESCRIPTION

Figure 1:
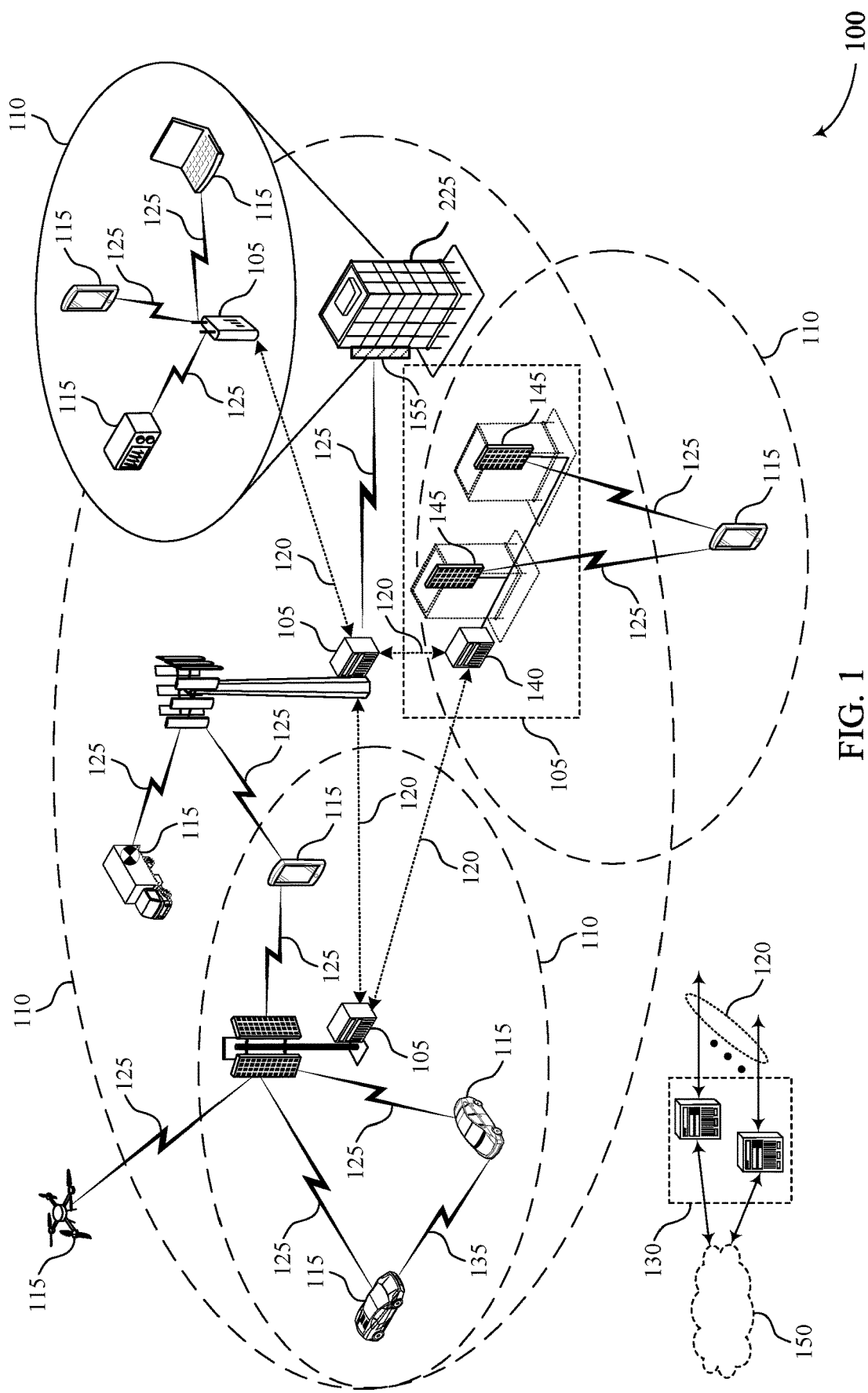
FIGS. 1 through 3 illustrate examples of wireless communications systems in accordance with aspects of the present disclosure.

In some examples, a user equipment (UE) may communicate control signaling, data, or both with a base station using a directional beam. For example, the UE and the base station may transmit a message across a beam path using the directional beam. However, an obstacle may block the beam path. In some cases, the message may not reach the destination because an object, such as a building, may block the beam path. In some examples, coverage is limited to line of sight (LOS) and specular reflections. In some cases, the base station or the UE may transmit the message to a repeater in an attempt to bypass the blockage. The repeater may receive the message from the UE and the base station and redirect the message towards a destination using a transmitter. In some examples, the repeater may incur a relatively high power consumption when redirecting the message (e.g., due to receiving the message, decoding the message, retransmitting the message, or a combination thereof). In some cases, the repeater may include a power amplifier that may use a power source.

To conserve power, a wireless communications system may include a channel engineering device that uses a low power electronic metamaterial to direct received signal energy from a transmitter toward a receiver. Unlike traditional repeaters, channel engineering device may be passive and may not include a power amplifier (PA). The channel engineering device may have nominal (e.g., minimal) power constraints or requirements and may consume power at reconfiguration (e.g., consumes power when a signal deflection direction is reconfigured). In some examples, the channel engineering device may be solar powered, battery operated, or the like. The channel engineering device may be inexpensive and implemented as a simple printed circuit board that may be of a desired size (e.g., may be made very large). The channel engineering device may improve UE separation by beamforming from closer-by and may be flat, permitting inclusion with a building's architecture. Signaling to configure the channel engineering device may consume relatively low bandwidth (e.g., very low bandwidth). Moreover, channel engineering device deflection settings may be determined using uplink (e.g., radio (Uu) interface) based angle of arrival (AoA) measurement procedures, and the Uu interface is inexpensive and available.

The channel engineering device may include specular reflectors, refractors, or both, to extend coverage to areas which are otherwise not covered. Both reflectors and refractors can also have a focusing, or energy concentration, effect to further enhance a communication link. In some cases, the base station may configure the metamaterial at the channel engineering device to direct signal energy in a desired direction. For example, the metamaterial may affect electromagnetic waves that interact with the structural features of the metamaterial. In an example, an electromagnetic metamaterial may affect electromagnetic waves that impinge on or interact with its structural features, which are smaller than a wavelength of the electromagnetic waves. In some examples, to behave as a homogeneous material accurately described by an effective refractive index, the structure features of the metamaterial may be much smaller than the wavelength. In an example, the metamaterial may include a grid of unit cells as the structural features, where each unit cell includes a tunable split ring resonator (SRR) and each unit cell is smaller than the wavelength (e.g., Unit Cell$<<\lambda$). The base station may transmit a control message that indicates one or more deflection settings to tune some or all of the SRRs to modify the effective refractive index of the metamaterial.

The electronically controllable metamaterial consumes a small amount of power to set the direction in which to deflect, or focus, received signal energy, but may not use power when directing signal energy (e.g., there is no decoding and retransmitting). That is, the channel engineering device may introduce a new class of network elements with one or more deflection settings that may be determined using network based measurement procedures (e.g., triggered by the base station). The one or more deflection settings may control how one or more unit cells interact with one or more electromagnetic waves of a received signal to deflect the one or more electromagnetic waves of the received signal in a desired manner (e.g., reflect or refract toward a receiver). Thus, the channel engineering device consumes less power as compared to a repeater that receives a signal and subsequently retransmits the signal.

The base station may transmit control signaling to the channel engineering device that triggers one or more AoA measurements. For example, the channel engineering device may measure an AoA between the base station and the channel engineering device, an AoA between the channel engineering device and one or more UEs, or both. The channel engineering device may transmit the AoA measurements to the base station in an AoA measurement report. The base station may modify one or more deflection settings at the channel engineering device to adjust an electronic metamaterial to reflect, focus, refract, or filter signal energy of a transmission by the base station toward the UE, a transmission by the UE toward the base station, or both. The base station may transmit the modified deflection settings to the channel engineering device in a beam shaping configuration. The base station may transmit a signal toward the channel engineering device, and the channel engineering device may modify the received signal energy based on the beam shaping configuration. In some cases, as the UE may move over time, the base station may configure the channel engineering device to update the AoA measurement between the channel engineering device and the UE based on a current location of the UE.

Aspects of the disclosure are initially described in the context of wireless communications systems. Aspects of the disclosure are further described in the context of a process flow. Aspects of the disclosure are further illustrated by and described with reference to apparatus diagrams, system diagrams, and flowcharts that relate to configurable deflection measurement and reporting.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may communicate with one or more UEs 115 in a coverage area 110 using one or more directional beams. An obstacle 225, such as a building, may prevent LOS transmission of a signal between base station 105 and UE 115. In some examples, the base station 105 may configure a channel engineering device 155 with a beam shaping configuration for modifying a directional beam used by the base station 105, the UEs 115, or a combination thereof for communicating. For example, the channel engineering device 155 may receive control signaling that triggers the channel engineering device 155 to perform one or more AoA measurements on one or more reference signals. The channel engineering device 155 may receive one or more reference signals from the base station 105, the UEs 115, or both. In some examples, the channel engineering device 155 may perform AoA measurements periodically.

Figure 2:
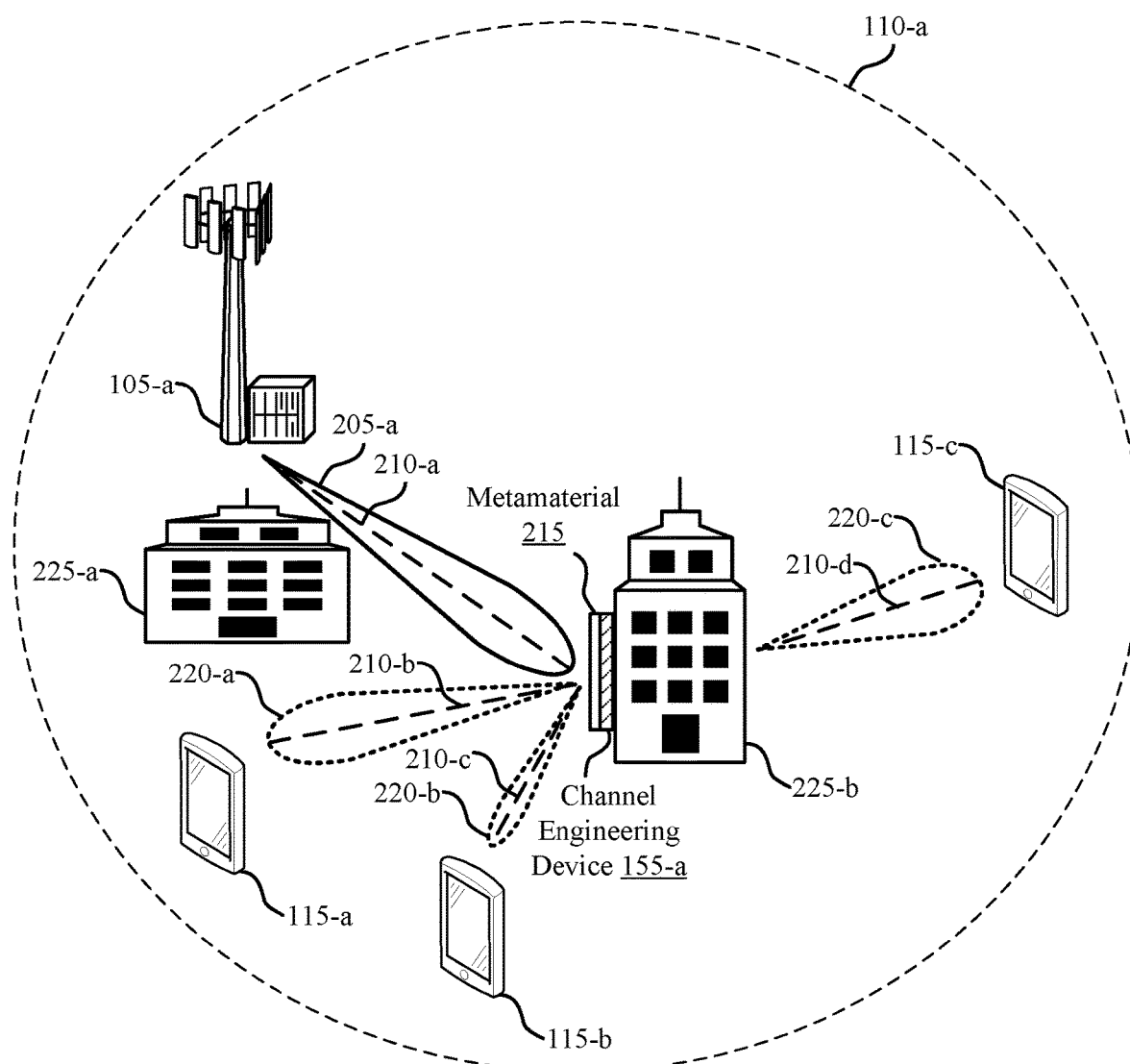

The channel engineering device 155 may transmit an AoA measurement report based on the AoA measurements. The base station may select a beam shaping configuration including one or more deflection settings at the channel engineering device 155 to configure a reflection configuration, a focusing configuration, a refraction configuration, or a filtering configuration for an incoming message. In some cases, the beam shaping configuration may modify the one or more deflection settings at the channel engineering device to adjust an electronic metamaterial. In some cases, the base station 105 and one or more UEs 115 may communicate using the channel engineering device 155 based on the beam shaping configuration FIG. 2 illustrates an example of a wireless communications system 200 in accordance with aspects of the present disclosure. In some examples, wireless communications system 200 may implement aspects of wireless communication system 100 and may include UE 115-a through UE 115-c, base station 105-a with coverage area 110-a, and channel engineering device 155-a, which may be examples of UEs 115, a base station 105 with a coverage area 110, and a channel engineering device 155 as described with reference to FIG. 1. In some examples, channel engineering device 155-a may be configured with, or otherwise support, a beam shaping configuration for communications between base station 105-a and one or more UEs 115 (e.g., UE 115-a through UE 115-c). For example, UE 115-a through UE 115-c and base station 105-a may communicate control information, data, or both using one or more directional beams 205. Channel engineering device 155-a may modify a received signal energy of a directional beam 205 to form a modified directional beam 220 based on the beam shaping configuration.

In some cases, a base station 105 may communicate with a UE 115 using a directional beam 205 with a directional beam path 210. For example, base station 105-a may communicate with a UE 115 using directional beam 205-a with directional beam path 210-a. However, in some cases, there may be an obstacle 225 between the base station 105 and the UE 115. That is, base station 105-a may be unable to communicate with UEs 115 that do not satisfy a LOS condition. In some cases, an obstacle 225 may prevent LOS communication between base station 105-a and one or more of UE 115-a, UE 115-b, or UE 115-c. For example, obstacle 225-a may prevent LOS communication between base station 105-a and UE 115-a, UE 115-b, or both. Obstacle 225-b may prevent LOS communication between base station 105-a and UE 115-c. Thus, it may be beneficial for base station 105-a to configure channel engineering device 155-a to extend the coverage area 110-a. In some cases, base station 105-a may configure channel engineering device 155-a with a beam shaping configuration based on one or more AoA measurements, which is described in further detail with respect to FIG. 3.

In some examples, a channel engineering device 155 may include a metamaterial 215 and a base station 105 may configure one or more deflection settings of the channel engineering device 155. The channel engineering device may apply the one or more deflection settings to electronically control in which direction the metamaterial 215 directs received signal energy. For example, the metamaterial 215 may focus received signal energy (e.g., focusing refraction), reflect received signal energy, refract received signal energy, filter received signal energy, or any combination thereof to enhance a communication link between the base station 105 and the UE 115. In some cases, the metamaterial 215 may affect electromagnetic waves that interact with its structural features, which may be smaller than the wavelength. In some examples, base station 105-a may configure channel engineering device 155-a to reflect signal energy from directional beam path 210-a to form a modified directional beam 220-a pointed along directional beam path 210-b toward UE 115-a, or to form a modified directional beam 220-b pointed along directional beam path 210-c toward UE 115-b, or both. In some other examples, base station 105-a may configure channel engineering device 155-a to refract signal energy from directional beam path 210-a to form a modified directional beam 220-c pointed along directional beam path 210-d toward UE 115-c. Additionally or alternatively, base station 105-a may configure channel engineering device 155-a to focus signal energy or filter signal energy from directional beam 205-a (e.g., along directional beam path 210-b through directional beam path 210-d). In some cases, the base station 105-a may configure channel engineering device 155-a to form modified directional beams 220-a, 220-b, and 220-c simultaneously or in different time periods.

Figure 3:
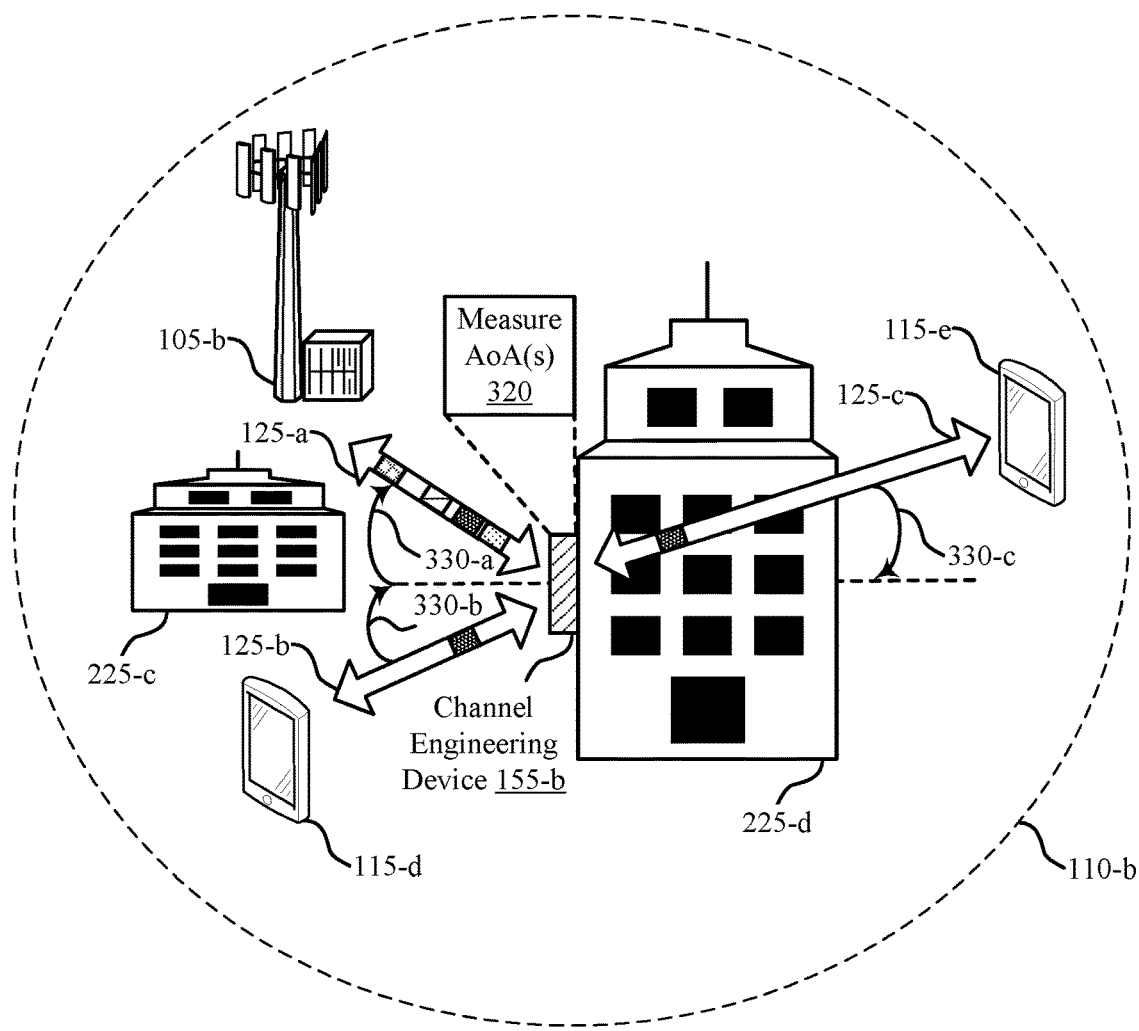
Figure 3:
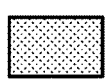
Figure 3:
Figure 3:
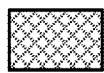
Figure 3:

FIG. 3 illustrates an example of a wireless communications system 300 in accordance with aspects of the present disclosure. In some examples, wireless communications system 300 may implement aspects of wireless communication system 100, wireless communications system 200, or both. Wireless communications system 300 may include UE 115-d, UE 115-e, communication links 125-a through 125-c, base station 105-b with coverage area 110-b, obstacle 225-c, obstacle 225-d, and channel engineering device 155-b, which may be examples of UEs 115, communication links 125, a base station 105 with a coverage area 110, obstacles 225, and a channel engineering device 155 as described with reference to FIGS. 1 and 2. In some examples, channel engineering device 155-b may be configured with, or otherwise support, a beam shaping configuration 305 for communications between base station 105-a and one or more UEs 115 (e.g., UE 115-d and UE 115-e) based on one or more AoA measurements.

In some cases, a base station 105 may communicate with one or more UEs 115 in a coverage area 110 using one or more directional beams. As described with reference to FIG. 2, an obstacle 225, such as a building, may prevent a signal from reaching a destination via LOS transmission. For example, obstacle 225-c may present a blockage for a signal trying to reach UE 115-d via LOS transmission. Similarly, obstacle 225-d may prevent a signal from reaching UE 115-e via LOS transmission. In some examples, base station 105-b may configure channel engineering device 155-b with a beam shaping configuration for modifying a directional beam used by base station 105-b, UE 115-d, UE 115-e, or a combination thereof for communicating. For example, channel engineering device 155-b may receive control signaling 315 that triggers channel engineering device 155-b to perform one or more AoA measurements at 320.

Channel engineering device 155-b may perform an AoA measurement on one or more reference signals 325. For example, channel engineering device 155-b may receive a reference signal 325 from base station 105-b, UE 115-d, UE 115-e, or a combination thereof. Channel engineering device 155-b may perform an AoA measurement for a reference signal 325 from base station 105-b, which may be AoA 330-a. In some cases, the reference signal 325 from base station 105-b may be an existing downlink signal such as a channel state information-reference signal (CSI-RS), a tracking reference signal (TRS), a synchronization signal block (SSB), or the like. In some examples, channel engineering device 155-b may perform one or more AoA measurement for reference signals 325 from UE 115-d, UE 115-e, or both, which may be AoA 330-b and AoA 330-c, respectively. In some cases, the reference signals 325 from UE 115-d, UE 115-e, or both may be an existing uplink signal such as a sounding reference signal (SRS). In some examples, channel engineering device 155-b may perform the AoA measurements periodically, aperiodically, semi-statically, or the like, as instructed by the base station 105-b. Base station 105-b may indicate the period in the control signaling 315. In some cases, channel engineering device 155-b may update the AoA measurement periodically based on the mobility of UE 115-d, UE 115-e, or both.

Channel engineering device 155-b may transmit an AoA measurement report 335 based on the AoA measurements performed at 320. The AoA measurement report 335 may include AoA 330-a through AoA 330-c. The base station may modify one or more deflection settings at channel engineering device 155-b to specify a reflection configuration, a focusing configuration, a refraction configuration, or a filtering configuration for an incoming message (e.g., via a directional beam as described with reference to FIG. 2) based on the AoA measurement report 335. In some examples, channel engineering device 155-b may transmit an AoA measurement report 335 including a separate measurement of each reference signal 325. In some cases, base station 105-b may process the AoA measurement report to determine a beam shaping configuration 305 that modifies the one or more deflection settings at channel engineering device 155-b to adjust an electronic metamaterial of channel engineering device 155-b to focus received signal energy, reflect received signal energy, refract received signal energy, filter received signal energy, or any combination thereof. In some cases, base station 105-b, UE 115-d, and UE 115-e, may communicate using channel engineering device 155-b based on the beam shaping configuration 305, which may reduce power consumption, bandwidth, distance between the UE 115 and the base station 105, and cost among other advantages (e.g., when compared with using a repeater).

For example, channel engineering device 155-b may reflect a received signal energy for a transmission from base station 105-b to UE 115-d, or vice-versa, along communication link 125-a and communication link 125-b based on AoA 330-a and AoA 330-b. In some other examples, channel engineering device 155-b may refract a received signal energy for a transmission from base station 105-b to UE 115-e, or vice-versa, along communication link 125-a and communication link 125-c based on AoA 330-a and AoA 330-c. Additionally or alternatively, channel engineering device 155-b may filter or focus received signal energy for communications along communication link 125-a through communication link 125-c, which may enhance the quality of the communication link 125.

In some cases, base station 105-b may transmit a control message indicating the beam shaping configuration 305 to configure one or more deflection settings stored in a channel engineering device database of the channel engineering device 155-b. For example, base station 105-b may transmit the control message as radio resource control (RRC) signaling to update one or more deflection settings in the channel engineering device database of the channel engineering device 155-b. The channel engineering device 155-b may apply the one or more settings loaded in the channel engineering device database to direct received signal energy in accordance with the one or more deflection settings, such as toward a UE 115-f for downlink transmission or toward base station 105-c for uplink transmissions.

Figure 4:
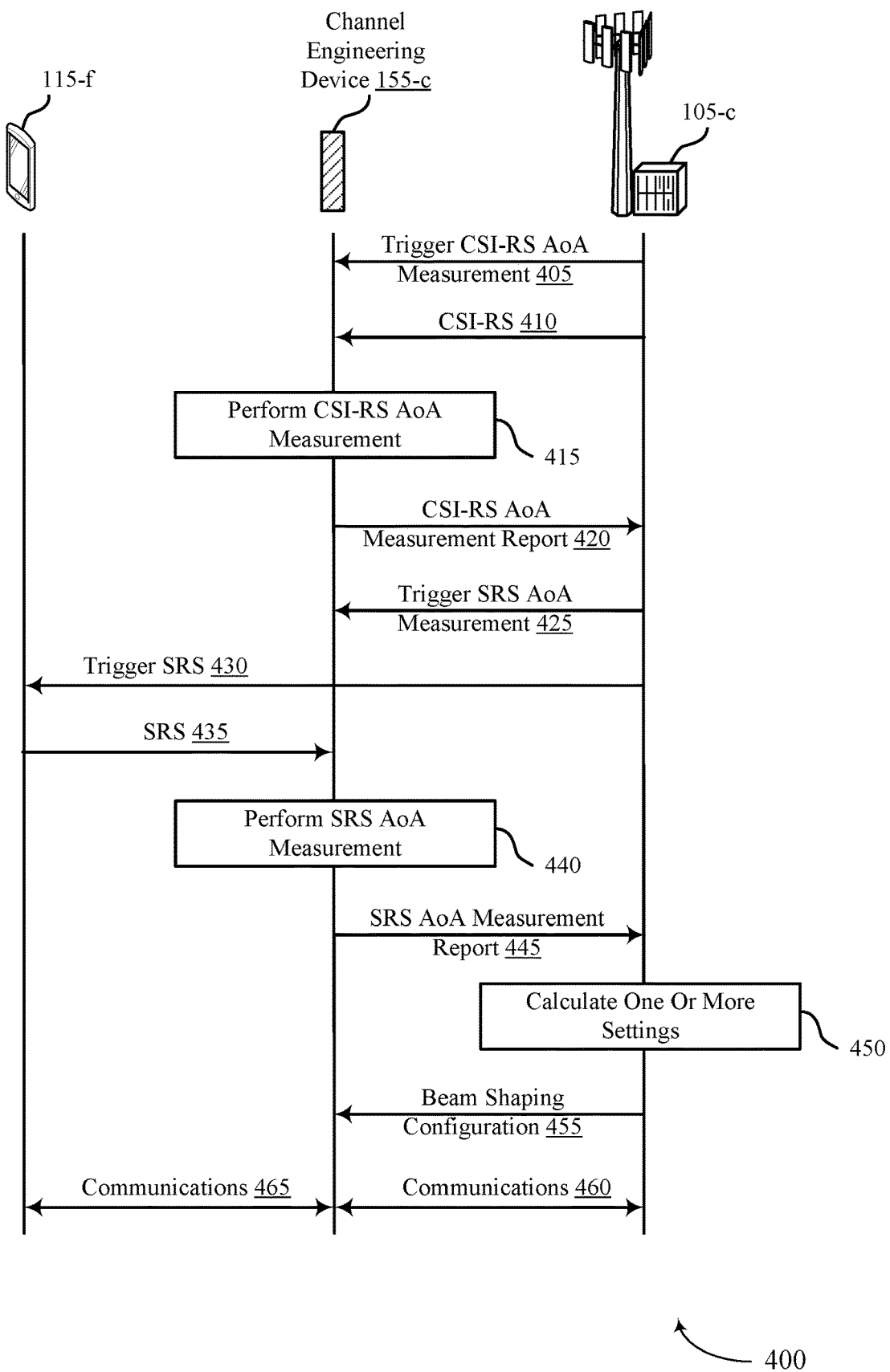
FIG. 4 illustrates an example of a process flow in accordance with aspects of the present disclosure.

FIG. 4 illustrates an example of a process flow 400 in accordance with aspects of the present disclosure. In some examples, process flow 400 may implement aspects of wireless communications system 100, wireless communications system 200, wireless communications system 300, or a combination thereof. The process flow 400 may illustrate an example of a channel engineering device 155, such as channel engineering device 155-c, measuring one or more AoAs for a beam shaping configuration. Alternative examples of the following may be implemented, where some processes are performed in a different order than described or are not performed. In some cases, processes may include additional features not mentioned below, or further processes may be added.

At 405, channel engineering device 155-c may receive control signaling from base station 105-c. For example, the control signaling may be RRC signaling. The control signaling may trigger channel engineering device 155-c to perform one or more angle of arrival measurements on one or more reference signals. For example, the control signaling may trigger a CSI-RS AoA measurement at channel engineering device 155-c.

For example, at 410, channel engineering device 155-c may receive a reference signal from base station 105-c, such as a CSI-RS. In some cases, the reference signal from base station 105-c may include a downlink signal such as a CSI-RS, a TRS, an SSB, or the like.

At 415, channel engineering device 155-c may perform an AoA measurement on the reference signal from 410 to determine an angle of arrival between the base station 105-c and the channel engineering device 155-c based on the reference signal transmission by the base station 105-c. For example, channel engineering device 155-c may perform a CSI-RS AoA measurement. In some cases, the AoA measurement between the base station 105-c and the channel engineering device 155-c may occur infrequently as the location of each may be fixed. At 420, channel engineering device 155-c may transmit an AoA measurement report to base station 105-c based on the control signaling at 405. The AoA measurement report may include the AoA measurement of the reference signal from 410. For example, the AoA measurement report may be a CSI-RS measurement report.

At 425, channel engineering device 155-c may receive additional control signaling from base station 105-c. For example, the additional control signaling may be RRC signaling. The additional control signaling may trigger channel engineering device 155-c to perform one or more angle of arrival measurements on one or more reference signals. For example, the control signaling may trigger an SRS AoA measurement at channel engineering device 155-c.

For example, at 430, base station 105-c may trigger a reference signal transmission at UE 115-f, such as an SRS transmission. At 435, channel engineering device 155-c may receive the triggered reference signal from UE 115-f, such as the SRS.

At 440, channel engineering device 155-c may perform an AoA measurement on the reference signal from 435 to determine an angle of arrival between the UE 115-f and the channel engineering device 155-c based on the reference signal transmission by the UE 115-f. For example, channel engineering device 155-c may perform an SRS AoA measurement. At 445, channel engineering device 155-c may transmit an AoA measurement report to base station 105-c based on the control signaling at 425. The AoA measurement report may include the AoA measurement of the reference signal from 435. For example, the AoA measurement report may be an SRS measurement report. In some examples, channel engineering device 155-c may transmit each AoA measurement for each reference signal in a separate report.

At 450, base station 105-c may calculate one or more deflection settings to adjust an electronic metamaterial of channel engineering device 155-c to focus received signal energy, reflect received signal energy, refract received signal energy, filter received signal energy, or any combination thereof based on the AoA measurement reports (e.g., the CSI-RS AoA measurement report and the SRS AoA measurement report).

At 455, channel engineering device 155-c may receive a beam shaping configuration from base station 105-c based on the AoA measurement reports. In some cases, the beam shaping configuration may indicate the one or more deflection settings to adjust an electronic metamaterial of channel engineering device 155-c to focus received signal energy, reflect received signal energy, refract received signal energy, filter received signal energy, or any combination thereof. Channel engineering device 155-c may modify a directional beam based on the beam shaping configuration. For example, at 460 and 465, base station 105-c may communicate with UE 115-f (e.g., via one or more directional beams) by sending or receiving the transmission to or from channel engineering device 155-c. Channel engineering device 155-c may apply the beam shaping configuration from 455 to the transmission to direct the received signal energy toward the receiver (e.g., the UE 115-f for downlink transmissions and the base station 105-c for uplink transmissions).

In some examples, base station 105-c may transmit second control signaling (e.g., RRC signaling) to channel engineering device 155-c. In some cases, the control signaling, the second control signaling, or both may configure channel engineering device 155-c to monitor a reference signal transmission resource periodically or semi-statically for a subsequent reference signal transmission by UE 115-f. For example, the UE 115-f may move around relative to the channel engineering device 155-c and thus the angle of arrival between the UE 115-f and the channel engineering device 155-c may change over time. The channel engineering device 155-c may update the AoA measurements for tracking UE mobility.

Channel engineering device 155-c may receive a second reference signal from UE 115-f. The second control signaling may trigger channel engineering device 155-c to perform a second AoA measurement on the second reference signal. Channel engineering device 155-c may transmit a second AoA measurement report based on the second AoA measurement. Base station 105-c may determine an updated beam shaping configuration based on the second AoA measurement report. Base station 105-c may transmit the updated beam shaping configuration to channel engineering device 155-c based on the control signaling, the second control signaling, or both. The updated beam shaping configuration may configure one or more deflection settings to direct received signal energy toward UE 115-f based on a current location of the UE 115-f relative to the channel engineering device 155-c.

Figure 5:
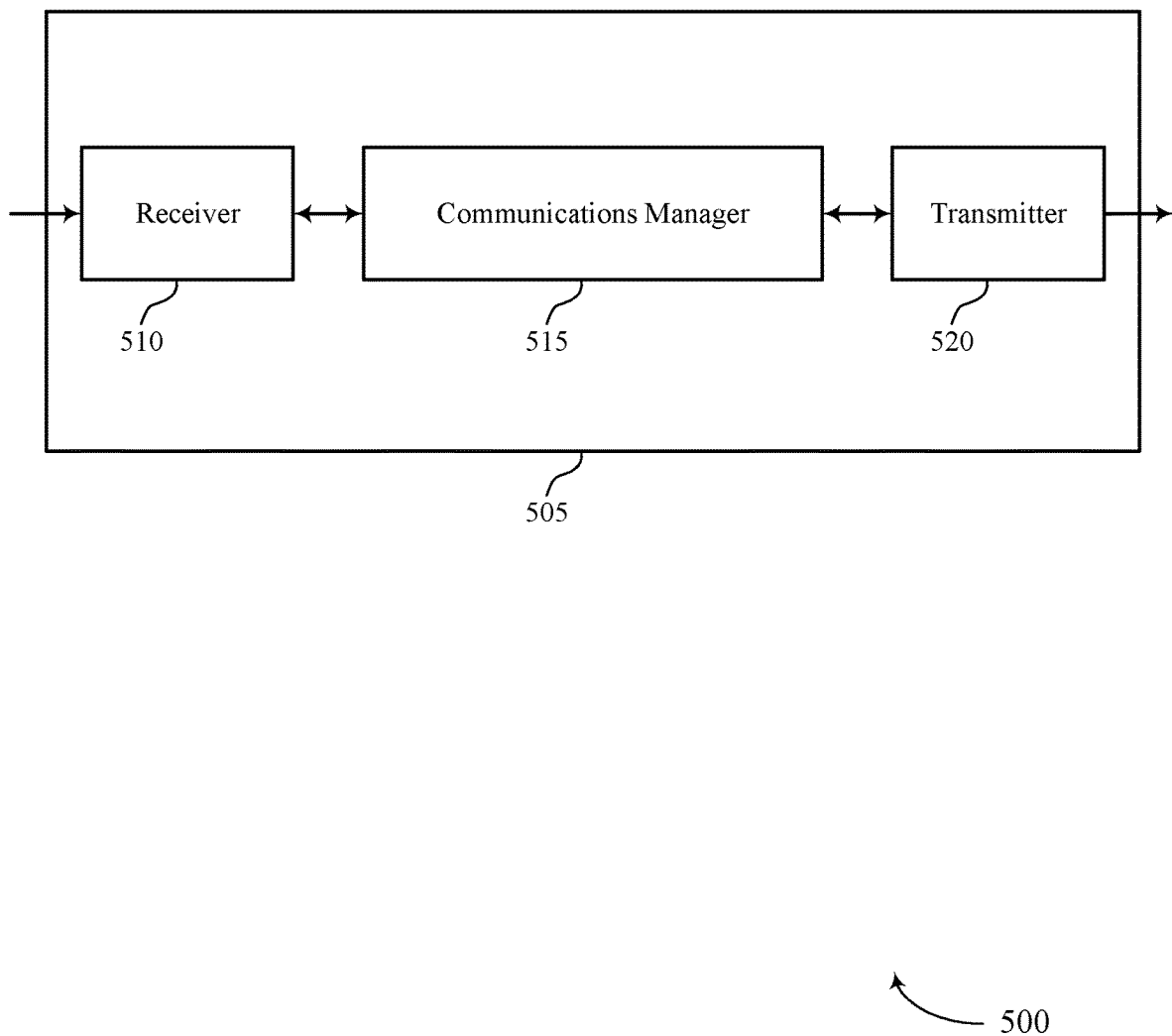
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of a base station 105 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to configurable deflection measurement and reporting, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit, to a channel engineering device, control signaling triggering the channel engineering device to perform a first AoA measurement for a first reference signal transmission by the base station and a second AoA measurement for a second reference signal transmission by a UE, receive, based on the control signaling, at least one AoA measurement report that indicates the first AoA measurement, the second AoA measurement, or both, and transmit, to the channel engineering device, a control message that indicates a beam shaping configuration based on the at least one AoA measurement report. The communications manager 515 may be an example of aspects of the communications manager 810 described herein.

The actions performed by the communications manager 515 as described herein may be implemented to realize one or more potential advantages. One implementation may enable a channel engineering device to receive a beam shaping configuration from a base station based on one or more AoA measurement reports. The beam shaping configuration may enable the channel engineering device to modify a directional beam to enhance link reliability and broaden the coverage area of the base station, which may improve communication latency (e.g., related to blockages between a UE and the base station), among other advantages.

Based on implementing the beam shaping configuration as described herein, a processor of a channel engineering device, a UE, or a base station (e.g., a processor controlling the receiver 510, the communications manager 515, the transmitter 520, or a combination thereof) may reduce the impact or likelihood of inefficient communications due to blockages while reducing the cost when compared with a repeater and ensuring relatively efficient communications. For example, the channel engineering device with a configurable metamaterial described herein may leverage one or more AoA measurements to configure one or more settings of the metamaterial to focus received signal energy, reflect received signal energy, refract received signal energy, filter received signal energy, or any combination thereof, which may realize power savings at the UE (e.g., due to enhancing the communication link between the UE and the base station), among other benefits.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a field-programmable gate-array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
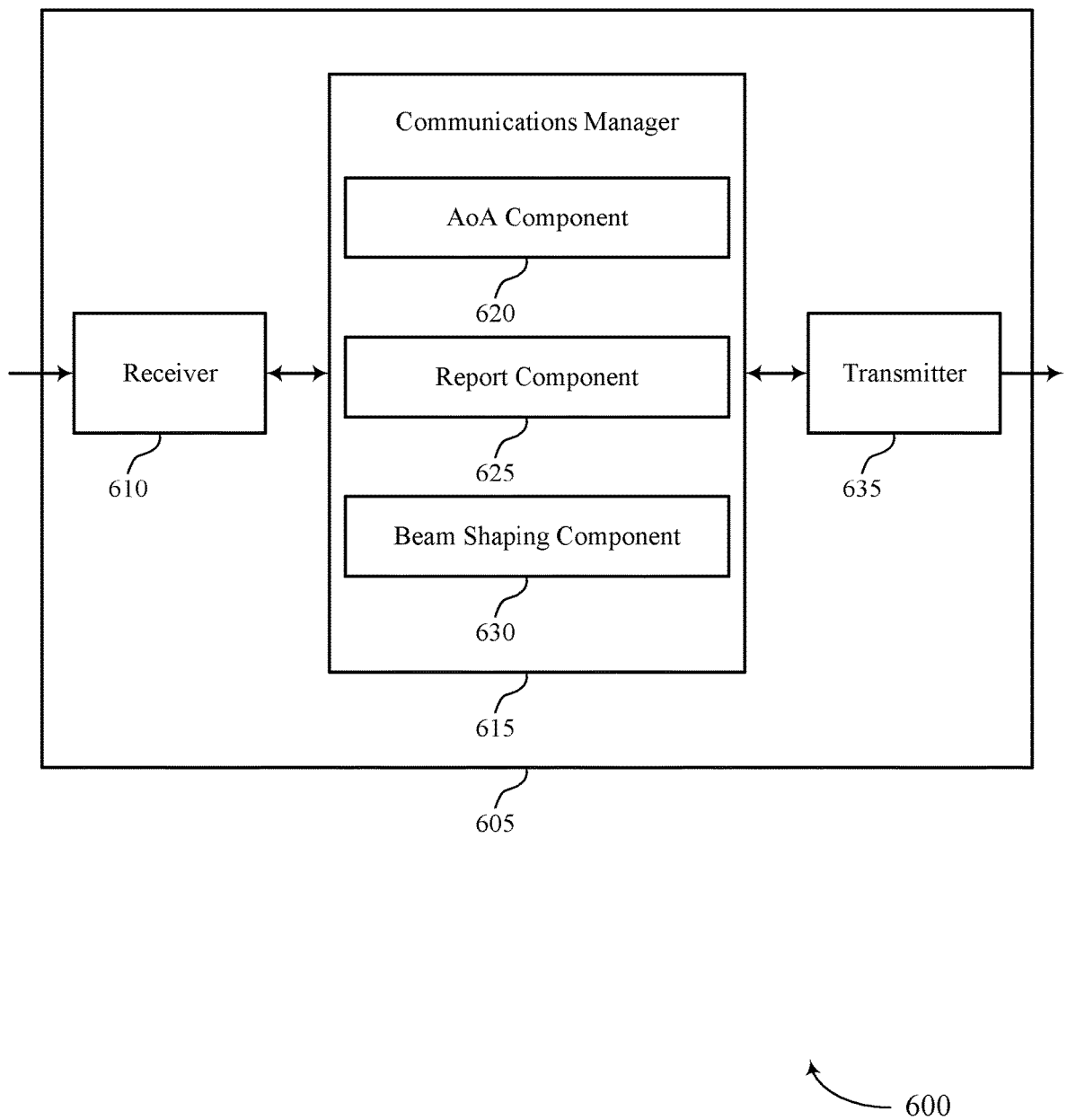

FIG. 6 shows a block diagram 600 of a device 605 in accordance with aspects of the present disclosure. The device 605 may be an example of aspects of a device 505, or a base station 105 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to configurable deflection measurement and reporting, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an AoA component 620, a report component 625, and a beam shaping component 630. The communications manager 615 may be an example of aspects of the communications manager 810 described herein.

The AoA component 620 may transmit, to a channel engineering device, control signaling triggering the channel engineering device to perform a first AoA measurement for a first reference signal transmission by the base station and a second AoA measurement for a second reference signal transmission by a UE. The report component 625 may receive, based on the control signaling, at least one AoA measurement report that indicates the first AoA measurement, the second AoA measurement, or both. The beam shaping component 630 may transmit, to the channel engineering device, a control message that indicates a beam shaping configuration based on the at least one AoA measurement report.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
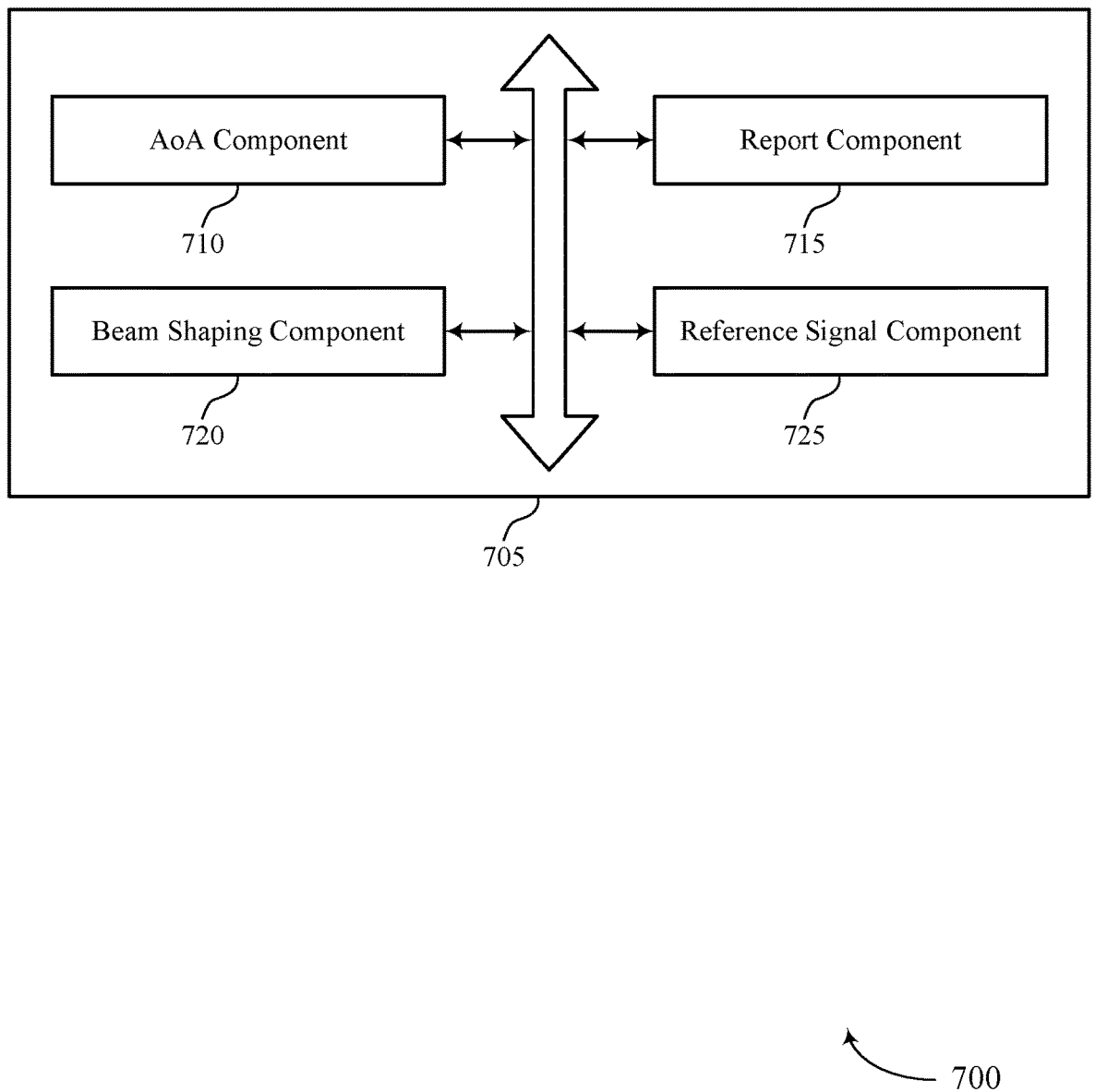
FIG. 7 shows a block diagram of a communications manager in accordance with aspects of the present disclosure.

FIG. 7 shows a block diagram 700 of a communications manager 705 in accordance with aspects of the present disclosure. The communications manager 705 may be an example of aspects of a communications manager 515, a communications manager 615, or a communications manager 810 described herein. The communications manager 705 may include an AoA component 710, a report component 715, a beam shaping component 720, and a reference signal component 725. Each of these modules may communicate, directly or indirectly, with one another (e.g., via one or more buses).

The AoA component 710 may transmit, to a channel engineering device, control signaling triggering the channel engineering device to perform a first AoA measurement for a first reference signal transmission by the base station and a second AoA measurement for a second reference signal transmission by a UE. The report component 715 may receive, based on the control signaling, at least one AoA measurement report that indicates the first AoA measurement, the second AoA measurement, or both. The beam shaping component 720 may transmit, to the channel engineering device, a control message that indicates a beam shaping configuration based on the at least one AoA measurement report.

In some examples, the report component 715 may receive a first measurement report message indicating the first AoA measurement. In some examples, the report component 715 may receive a second measurement report message indicating the second AoA measurement.

In some examples, the AoA component 710 may transmit, to the channel engineering device, second control signaling triggering the channel engineering device to perform a third AoA measurement for a third reference signal transmission by the UE. In some examples, the report component 715 may receive, based on the second control signaling, a second AoA measurement report that indicates the third AoA measurement. In some examples, the beam shaping component 720 may transmit, to the channel engineering device, a second control message that indicates an updated beam shaping configuration based on the second AoA measurement report.

The reference signal component 725 may transmit, to the channel engineering device, the first reference signal transmission based on the control signaling. In some examples, the reference signal component 725 may transmit the control signaling that configures the channel engineering device to monitor a reference signal transmission resource periodically or semi-statically for a subsequent reference signal transmission by the UE. In some examples, the reference signal component 725 may receive, based on the control signaling, an updated measurement reporting that indicates an updated AoA measurement for each subsequent reference signal transmission by the UE.

Figure 8:
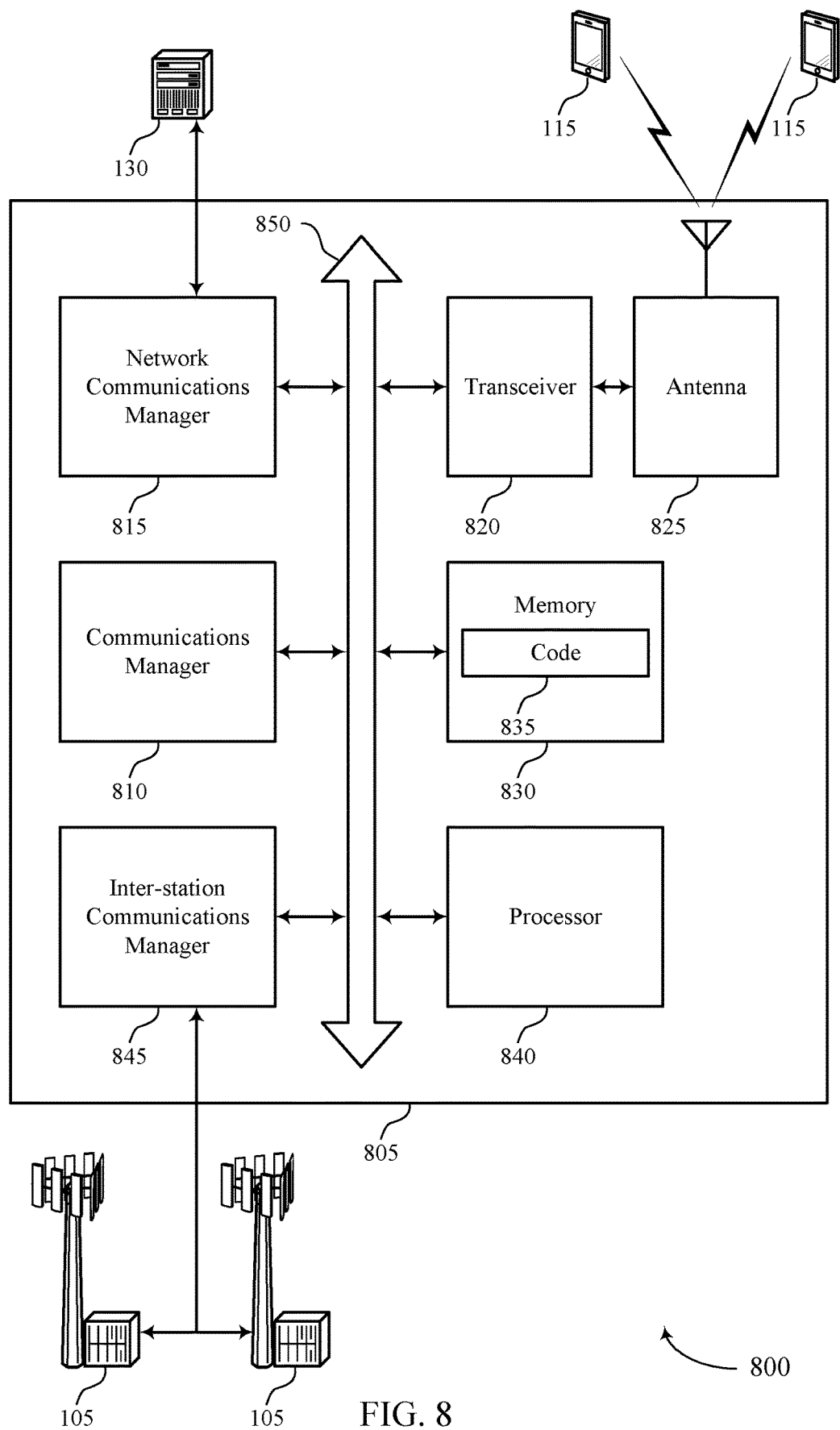
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or a base station 105 as described herein. The device 805 may include components for bi-directional voice and data communications including components for transmitting and receiving communications, including a communications manager 810, a network communications manager 815, a transceiver 820, an antenna 825, memory 830, a processor 840, and an inter-station communications manager 845. These components may be in electronic communication via one or more buses (e.g., bus 850).

The communications manager 810 may transmit, to a channel engineering device, control signaling triggering the channel engineering device to perform a first AoA measurement for a first reference signal transmission by the base station and a second AoA measurement for a second reference signal transmission by a UE, receive, based on the control signaling, at least one AoA measurement report that indicates the first AoA measurement, the second AoA measurement, or both, and transmit, to the channel engineering device, a control message that indicates a beam shaping configuration based on the at least one AoA measurement report.

The network communications manager 815 may manage communications with the core network (e.g., via one or more wired backhaul links). For example, the network communications manager 815 may manage the transfer of data communications for client devices, such as one or more UEs 115.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM), read-only memory (ROM), or a combination thereof. The memory 830 may store computer-readable code 835 including instructions that, when executed by a processor (e.g., the processor 840) cause the device to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a digital signal processor (DSP), a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In some cases, a memory controller may be integrated into processor 840. The processor 840 may be configured to execute computer-readable instructions stored in a memory (e.g., the memory 830) to cause the device 805 to perform various functions (e.g., functions or tasks supporting configurable deflection measurement and reporting).

The inter-station communications manager 845 may manage communications with other base station 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communication network technology to provide communication between base stations 105.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
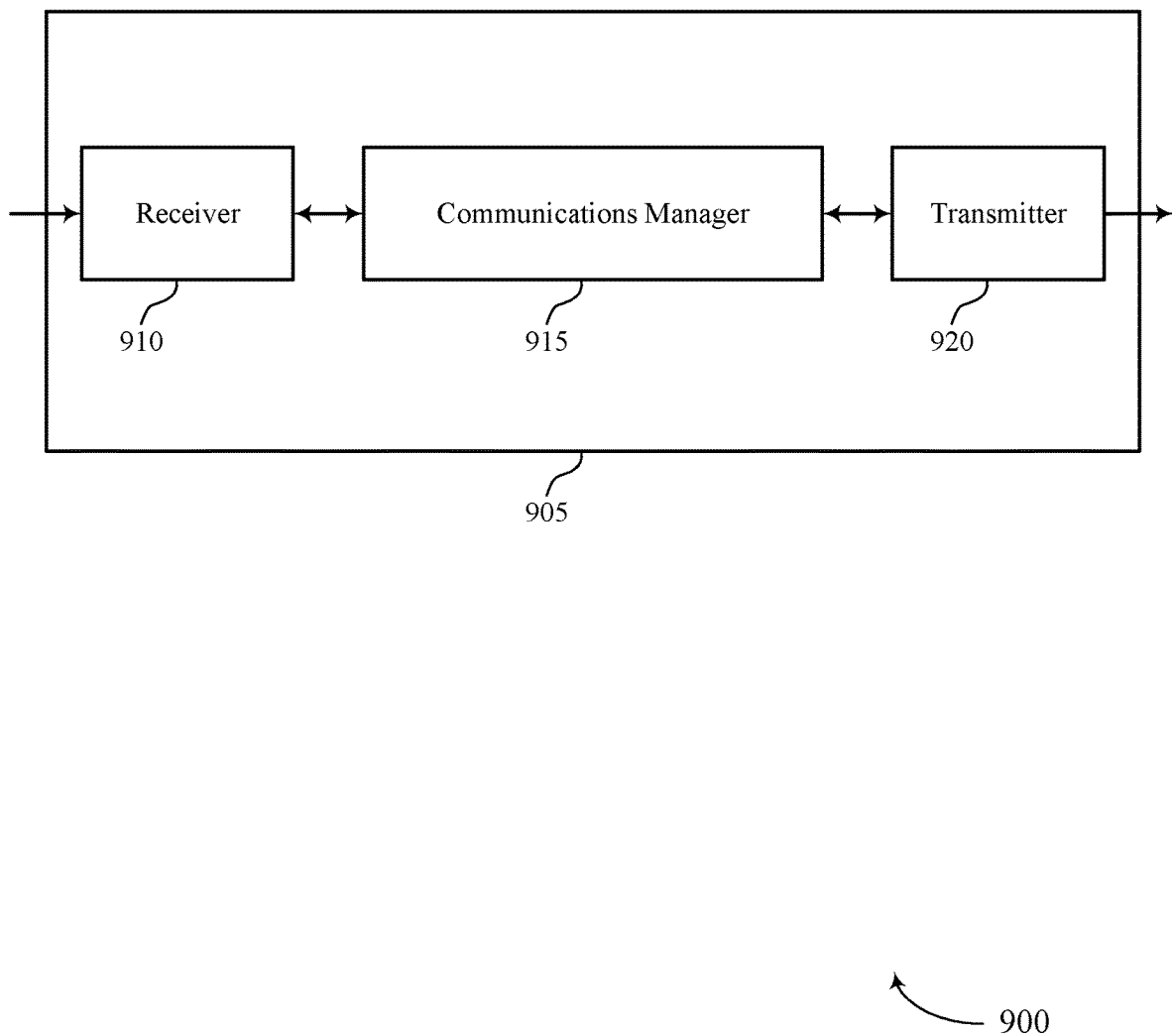
FIGS. 9 and 10 show block diagrams of devices in accordance with aspects of the present disclosure.

FIG. 9 shows a block diagram 900 of a channel engineering device 905 in accordance with aspects of the present disclosure. The channel engineering device 905 may be an example of aspects of a device as described herein. The channel engineering device 905 may include a receiver 910, a communications manager 915, and a transmitter 920. The channel engineering device 905 may also include a processor and an electronic metamaterial. Each of these components may be in communication with one another (e.g., via one or more buses).

The receiver 910 may receive information such as packets, user data, or control information associated with various information channels (e.g., control channels, data channels, and information related to configurable deflection measurement and reporting, etc.). Information may be passed on to other components of the channel engineering device 905. The receiver 910 may be an example of aspects of the transceiver 1220 described with reference to FIG. 12. The receiver 910 may utilize a single antenna or a set of antennas.

The communications manager 915 may receive, from a base station, control signaling triggering the channel engineering device to perform a first AoA measurement for a first reference signal transmission by the base station and a second AoA measurement for a second reference signal transmission by a UE, transmit, based on the control signaling, at least one AoA measurement report that indicates the first AoA measurement, the second AoA measurement, or both, and receive a control message that indicates a beam shaping configuration based on the at least one AoA measurement report. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
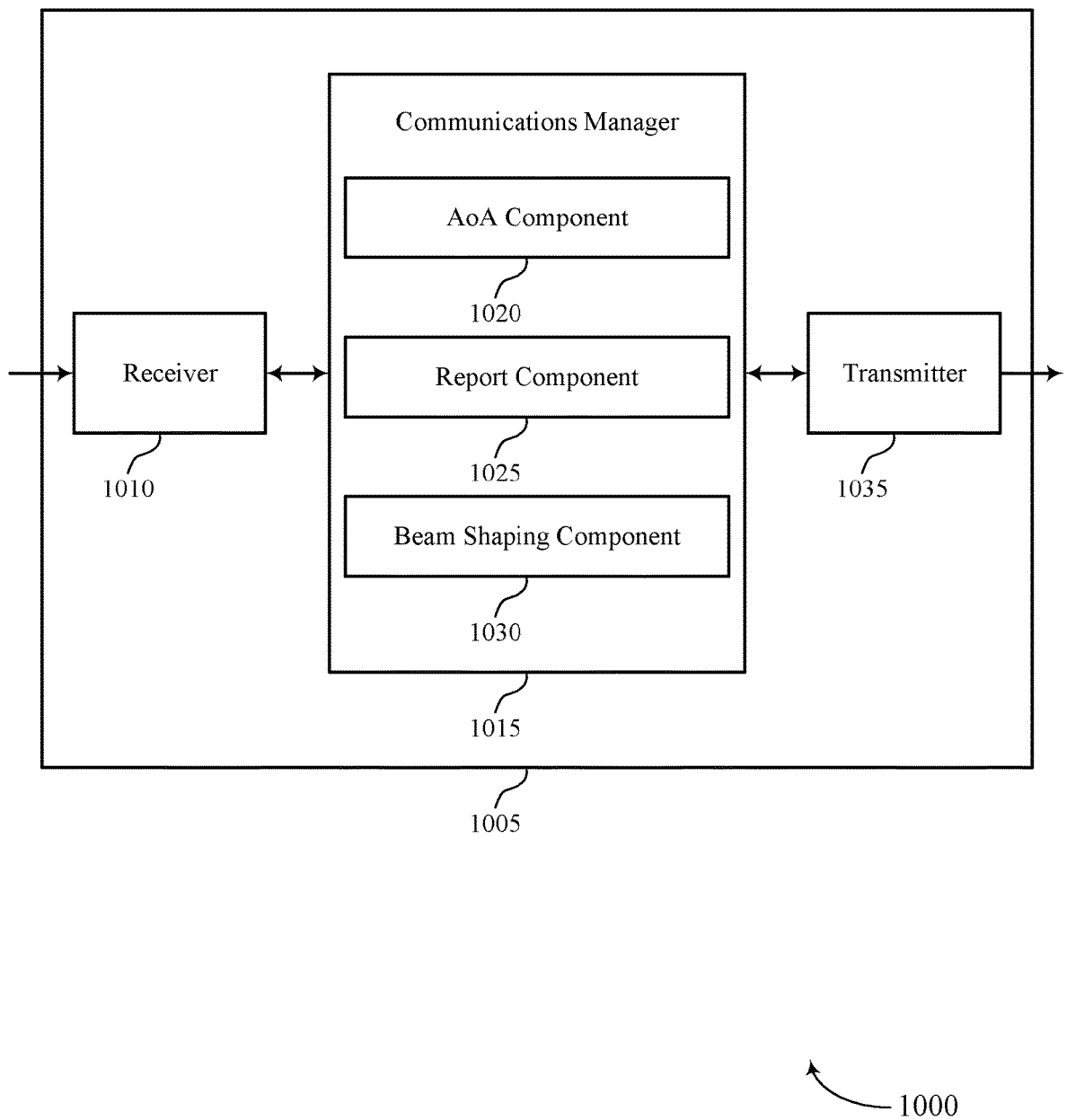

FIG. 10 shows a block diagram 1000 of a channel engineering device 1005 in accordance with aspects of the present disclosure. The channel engineering device 1005 may be an example of aspects of a device 905 or a UE 115 as described herein. The device 1005 may include a receiver 1010, a communications manager 1015, and a transmitter 1035. The channel engineering device 1005 may also include a processor and an electronic metamaterial. Each of these components may be in communication with one another (e.g., via one or more buses).

The receiver 1010 may receive information such as packets, user data, or control information associated with various information channels (e.g., control channels, data channels, and information related to configurable deflection measurement and reporting, etc.). Information may be passed on to other components of the channel engineering device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an AoA component 1020, a report component 1025, and a beam shaping component 1030. The communications manager 1015 may be an example of aspects of the communications manager 1210 described herein.

The AoA component 1020 may receive, from a base station, control signaling triggering the channel engineering device to perform a first AoA measurement for a first reference signal transmission by the base station and a second AoA measurement for a second reference signal transmission by a UE.

The report component 1025 may transmit, based on the control signaling, at least one AoA measurement report that indicates the first AoA measurement, the second AoA measurement, or both.

The beam shaping component 1030 may receive a control message that indicates a beam shaping configuration based on the at least one AoA measurement report.

The transmitter 1035 may transmit signals generated by other components of the channel engineering device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
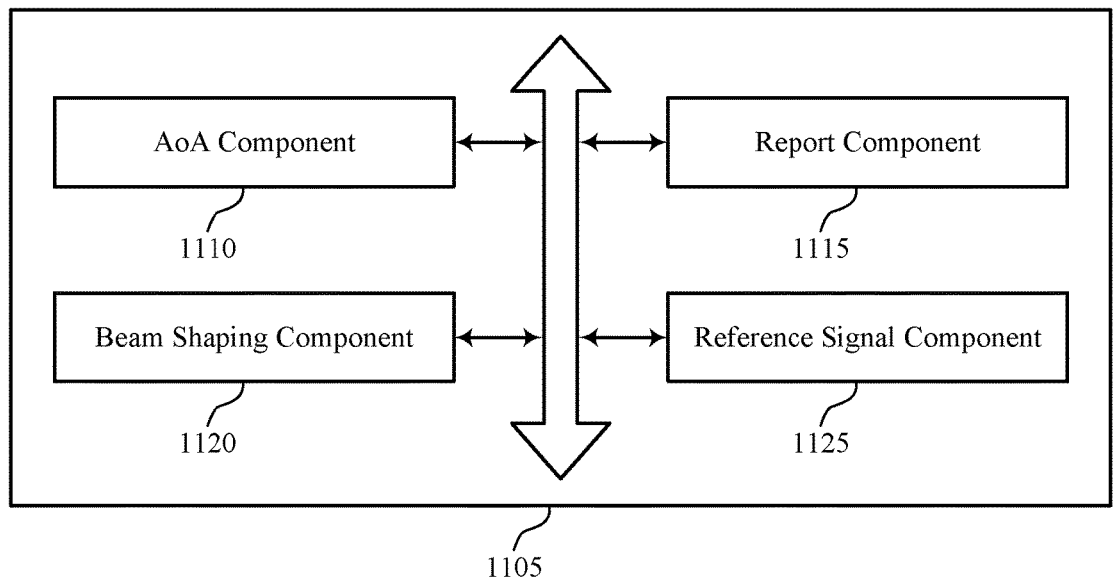
FIG. 11 shows a block diagram of a communications manager in accordance with aspects of the present disclosure.

FIG. 11 shows a block diagram 1100 of a communications manager 1105 in accordance with aspects of the present disclosure. The communications manager 1105 may be an example of aspects of a communications manager 915, a communications manager 1015, or a communications manager 1210 described herein. The communications manager 1105 may include an AoA component 1110, a report component 1115, a beam shaping component 1120, and a reference signal component 1125. Each of these modules may communicate, directly or indirectly, with one another (e.g., via one or more buses). The actions performed by communication manager 1105 may be implemented by a channel engineering device.

The AoA component 1110 may receive, from a base station, control signaling triggering the channel engineering device to perform a first AoA measurement for a first reference signal transmission by the base station and a second AoA measurement for a second reference signal transmission by a UE. The report component 1115 may transmit, based on the control signaling, at least one AoA measurement report that indicates the first AoA measurement, the second AoA measurement, or both. The beam shaping component 1120 may receive a control message that indicates a beam shaping configuration based on the at least one AoA measurement report.

In some examples, the AoA component 1110 may receive, from the base station, second control signaling triggering the channel engineering device to perform a third AoA measurement for a third reference signal transmission by the UE. In some examples, the report component 1115 may transmit, based on the second control signaling, a second AoA measurement report that indicates the third AoA measurement. In some examples, the beam shaping component 1120 may receive a second control message that indicates an updated beam shaping configuration based on the second AoA measurement report.

In some examples, the report component 1115 may transmit a first measurement report message indicating the first AoA measurement. In some examples, the report component 1115 may transmit a second measurement report message indicating the second AoA measurement.

The reference signal component 1125 may receive, from the base station, the first reference signal transmission based on the control signaling. In some examples, the reference signal component 1125 may perform the first AoA measurement of the first reference signal transmission.

In some examples, the reference signal component 1125 may receive, from the UE, the second reference signal transmission based on the control signaling. In some examples, the reference signal component 1125 may perform the second AoA measurement of the second reference signal transmission.

In some examples, the reference signal component 1125 may receive the control signaling that configures the channel engineering device to monitor a reference signal transmission resource periodically or semi-statically for a subsequent reference signal transmission by the UE. In some examples, the reference signal component 1125 may transmit, based on the control signaling, an updated measurement reporting that indicates an updated AoA measurement for each subsequent reference signal transmission by the UE.

Figure 12:
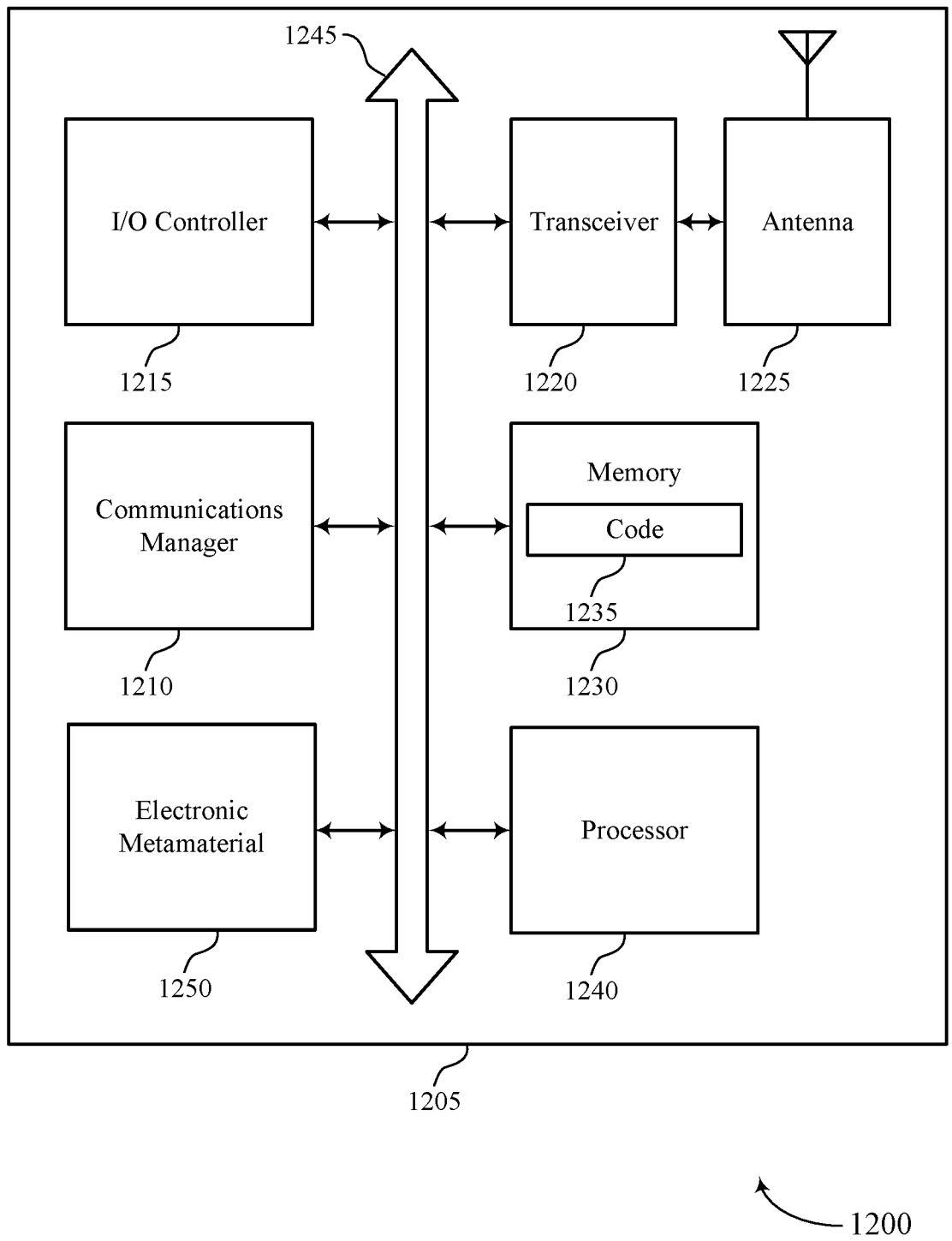
FIG. 12 shows a diagram of a system including a device in accordance with aspects of the present disclosure.

FIG. 12 shows a diagram of a system 1200 including a channel engineering device 1205 in accordance with aspects of the present disclosure. The channel engineering device 1205 may be an example of or include the components of channel engineering device 905, channel engineering device 1005, or a device as described herein. The channel engineering device 1205 may include components for bi-directional voice and data communications including components for transmitting and receiving communications, including a communications manager 1210, an I/O controller 1215, a transceiver 1220, an antenna 1225, memory 1230, a processor 1240, and an electronic metamaterial 1250. These components may be in electronic communication via one or more buses (e.g., bus 1245).

The communications manager 1210 may receive, from a base station, control signaling triggering the channel engineering device to perform a first AoA measurement for a first reference signal transmission by the base station and a second AoA measurement for a second reference signal transmission by a UE, transmit, based on the control signaling, at least one AoA measurement report that indicates the first AoA measurement, the second AoA measurement, or both, and receive a control message that indicates a beam shaping configuration based on the at least one AoA measurement report.

The I/O controller 1215 may manage input and output signals for the channel engineering device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the channel engineering device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the channel engineering device 1205 to perform various functions (e.g., functions or tasks supporting configurable deflection measurement and reporting). In some examples, the metamaterial 1250 may focus received signal energy (e.g., focusing refraction), reflect received signal energy, refract received signal energy, filter received signal energy, or any combination thereof to enhance a communication link between a base station 105 and a UE 115.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
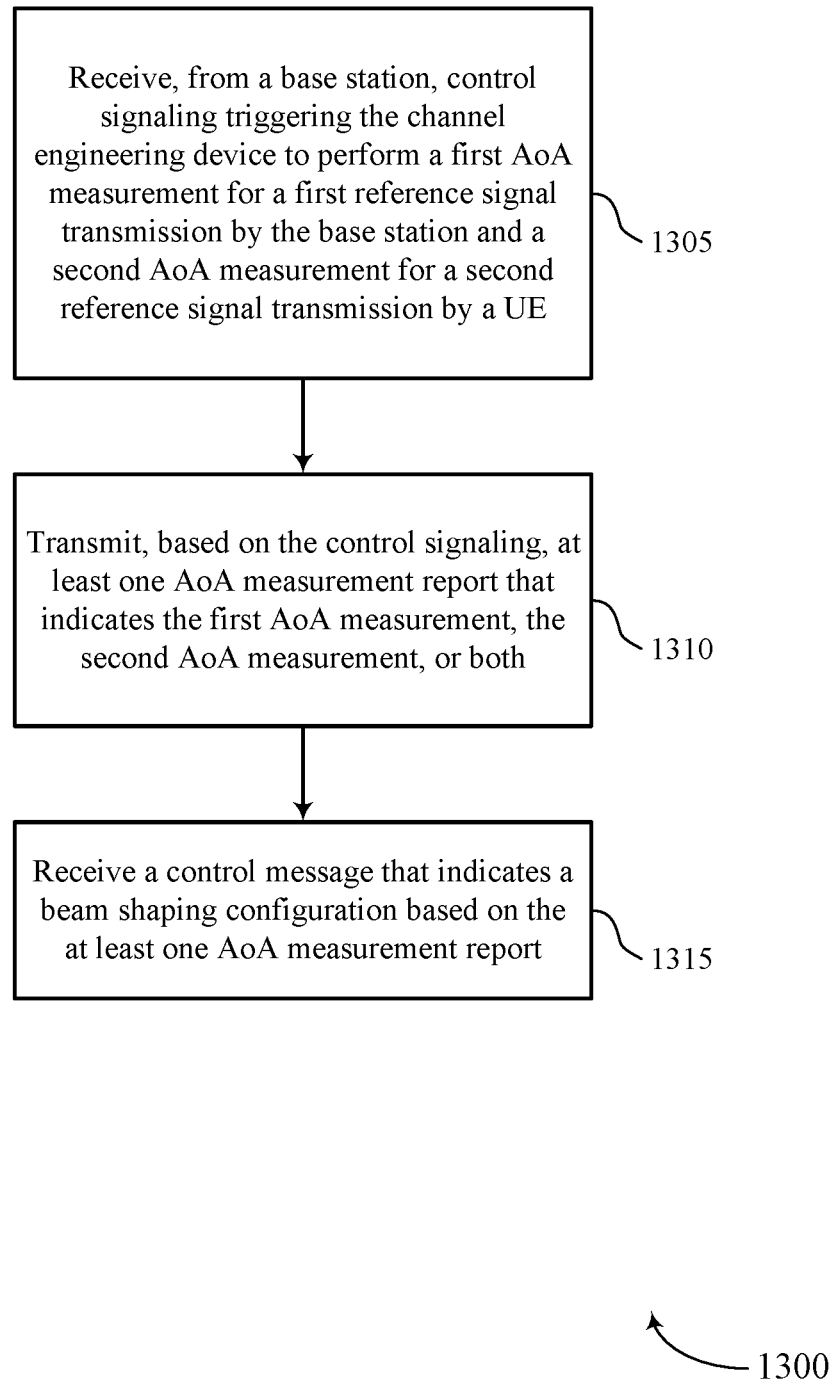
FIGS. 13 through 16 show flowcharts illustrating methods in accordance with aspects of the present disclosure.

FIG. 13 shows a flowchart illustrating a method 1300 in accordance with aspects of the present disclosure. The operations of method 1300 may be implemented by a device or its components as described herein. For example, the operations of method 1300 may be performed by a communications manager as described with reference to FIGS. 9 through 12. In some examples, a device may execute a set of instructions to control the functional elements of the device to perform the functions described below. Additionally or alternatively, a device may perform aspects of the functions described below using special-purpose hardware.

At 1305, the device may receive, from a base station, control signaling triggering the channel engineering device to perform a first AoA measurement for a first reference signal transmission by the base station and a second AoA measurement for a second reference signal transmission by a UE. The operations of 1305 may be performed according to the methods described herein. In some examples, aspects of the operations of 1305 may be performed by an AoA component as described with reference to FIGS. 9 through 12.

At 1310, the device may transmit, based on the control signaling, at least one AoA measurement report that indicates the first AoA measurement, the second AoA measurement, or both. The operations of 1310 may be performed according to the methods described herein. In some examples, aspects of the operations of 1310 may be performed by a report component as described with reference to FIGS. 9 through 12.

At 1315, the device may receive a control message that indicates a beam shaping configuration based on the at least one AoA measurement report. The operations of 1315 may be performed according to the methods described herein. In some examples, aspects of the operations of 1315 may be performed by a beam shaping component as described with reference to FIGS. 9 through 12.

Figure 14:
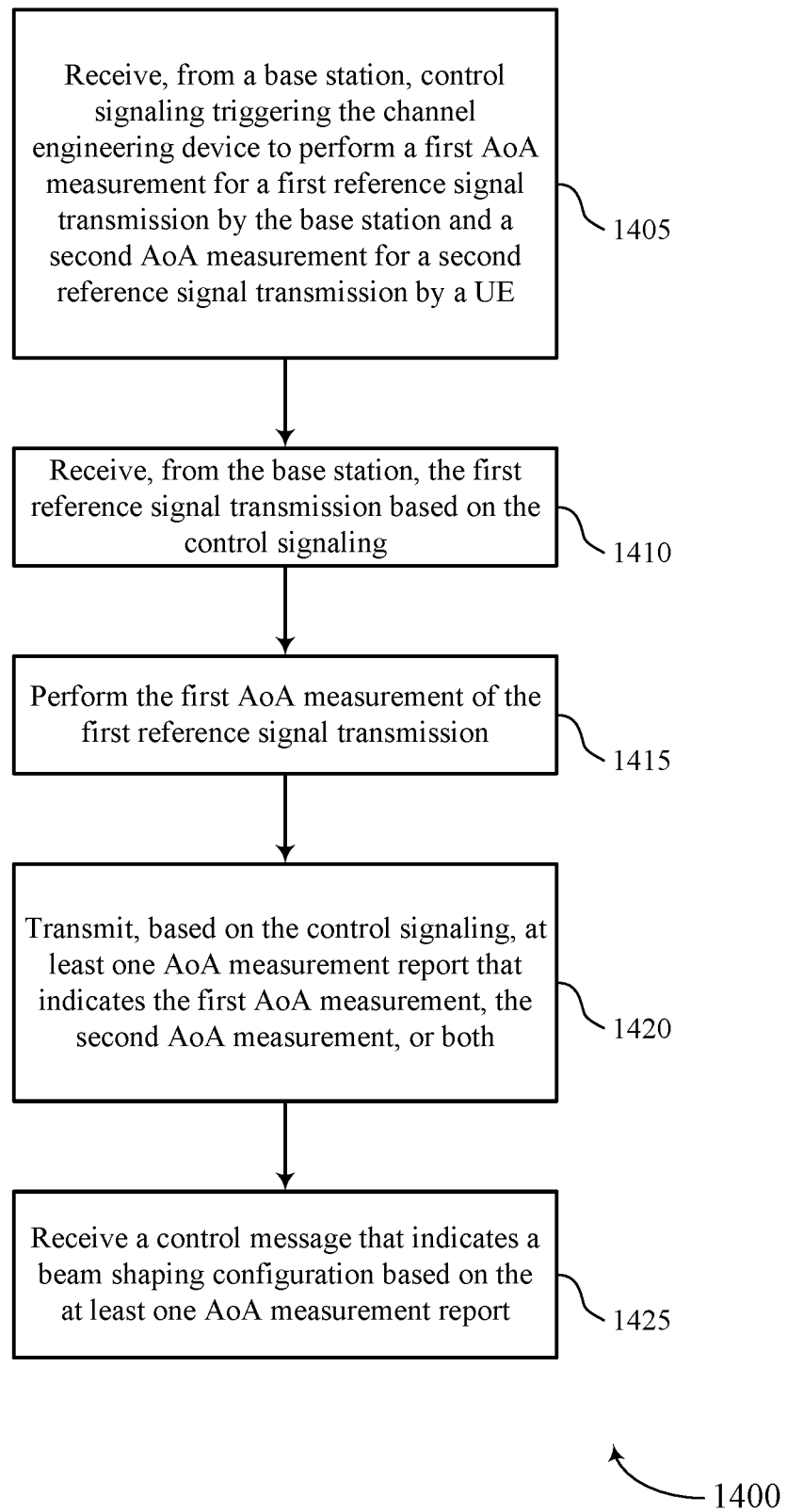

FIG. 14 shows a flowchart illustrating a method 1400 in accordance with aspects of the present disclosure. The operations of method 1400 may be implemented by a device or its components as described herein. For example, the operations of method 1400 may be performed by a communications manager as described with reference to FIGS. 9 through 12. In some examples, a device may execute a set of instructions to control the functional elements of the device to perform the functions described below. Additionally or alternatively, a device may perform aspects of the functions described below using special-purpose hardware.

At 1405, the device may receive, from a base station, control signaling triggering the channel engineering device to perform a first AoA measurement for a first reference signal transmission by the base station and a second AoA measurement for a second reference signal transmission by a UE. The operations of 1405 may be performed according to the methods described herein. In some examples, aspects of the operations of 1405 may be performed by an AoA component as described with reference to FIGS. 9 through 12.

At 1410, the device may receive, from the base station, the first reference signal transmission based on the control signaling. The operations of 1410 may be performed according to the methods described herein. In some examples, aspects of the operations of 1410 may be performed by a reference signal component as described with reference to FIGS. 9 through 12.

At 1415, the device may perform the first AoA measurement of the first reference signal transmission. The operations of 1415 may be performed according to the methods described herein. In some examples, aspects of the operations of 1415 may be performed by a reference signal component as described with reference to FIGS. 9 through 12.

At 1420, the device may transmit, based on the control signaling, at least one AoA measurement report that indicates the first AoA measurement, the second AoA measurement, or both. The operations of 1420 may be performed according to the methods described herein. In some examples, aspects of the operations of 1420 may be performed by a report component as described with reference to FIGS. 9 through 12.

At 1425, the device may receive a control message that indicates a beam shaping configuration based on the at least one AoA measurement report. The operations of 1425 may be performed according to the methods described herein. In some examples, aspects of the operations of 1425 may be performed by a beam shaping component as described with reference to FIGS. 9 through 12.

Figure 15:
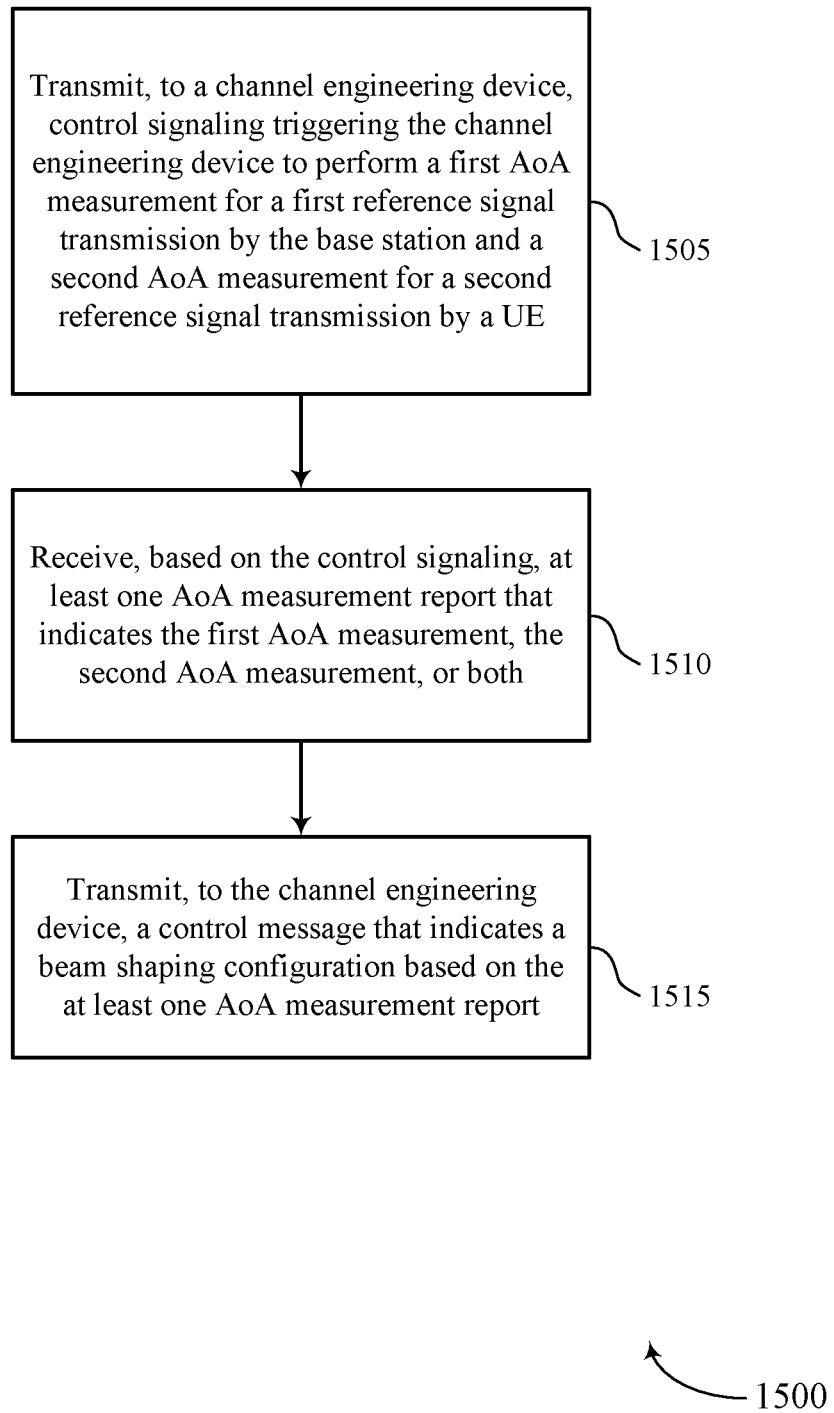

FIG. 15 shows a flowchart illustrating a method 1500 in accordance with aspects of the present disclosure. The operations of method 1500 may be implemented by a base station 105 or its components as described herein. For example, the operations of method 1500 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 1505, the base station may transmit, to a channel engineering device, control signaling triggering the channel engineering device to perform a first AoA measurement for a first reference signal transmission by the base station and a second AoA measurement for a second reference signal transmission by a UE. The operations of 1505 may be performed according to the methods described herein. In some examples, aspects of the operations of 1505 may be performed by an AoA component as described with reference to FIGS. 5 through 8.

At 1510, the base station may receive, based on the control signaling, at least one AoA measurement report that indicates the first AoA measurement, the second AoA measurement, or both. The operations of 1510 may be performed according to the methods described herein. In some examples, aspects of the operations of 1510 may be performed by a report component as described with reference to FIGS. 5 through 8.

At 1515, the base station may transmit, to the channel engineering device, a control message that indicates a beam shaping configuration based on the at least one AoA measurement report. The operations of 1515 may be performed according to the methods described herein. In some examples, aspects of the operations of 1515 may be performed by a beam shaping component as described with reference to FIGS. 5 through 8.

Figure 16:
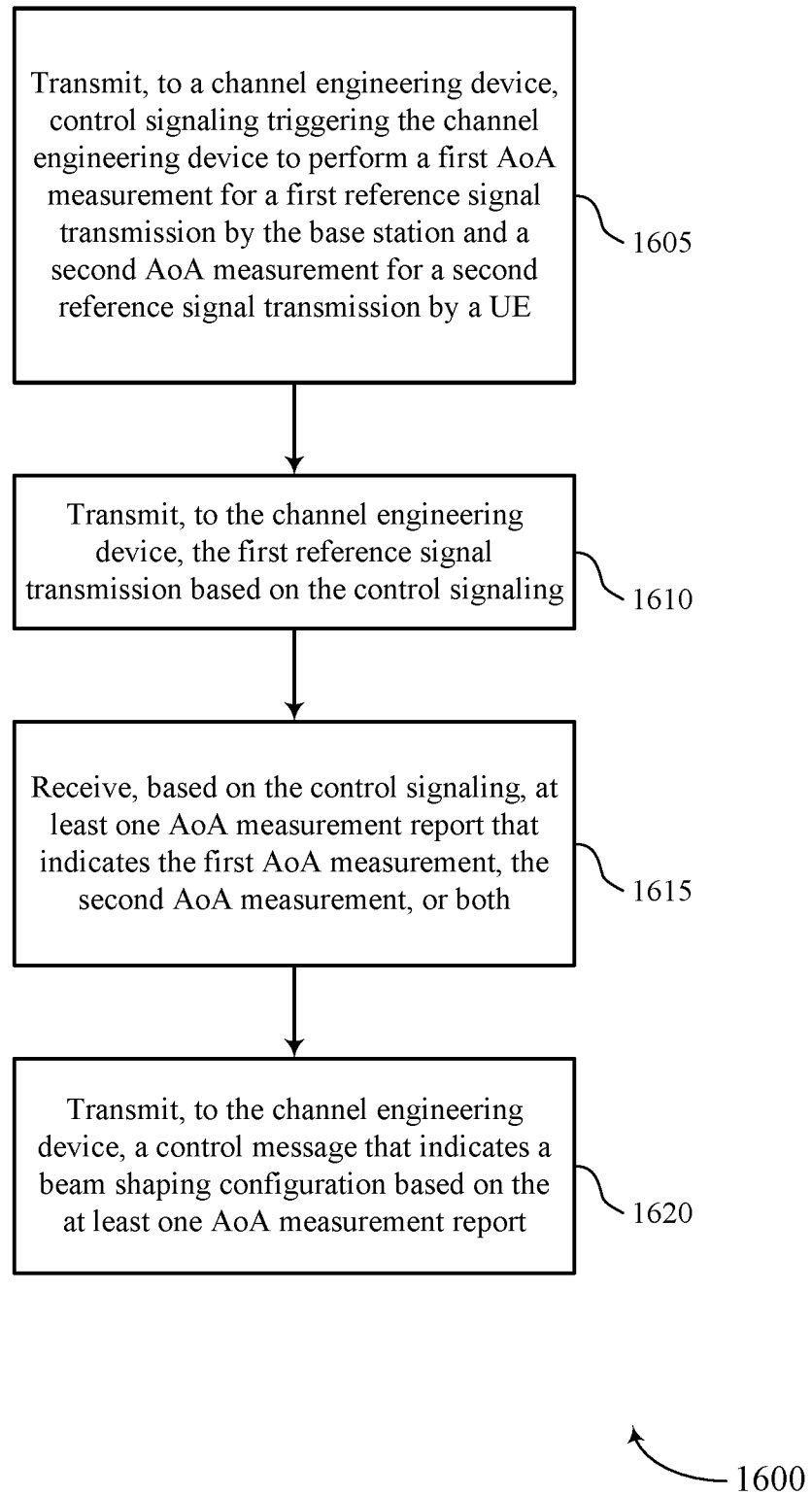

FIG. 16 shows a flowchart illustrating a method 1600 in accordance with aspects of the present disclosure. The operations of method 1600 may be implemented by a base station 105 or its components as described herein. For example, the operations of method 1600 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 1605, the base station may transmit, to a channel engineering device, control signaling triggering the channel engineering device to perform a first AoA measurement for a first reference signal transmission by the base station and a second AoA measurement for a second reference signal transmission by a UE. The operations of 1605 may be performed according to the methods described herein. In some examples, aspects of the operations of 1605 may be performed by an AoA component as described with reference to FIGS. 5 through 8.

At 1610, the base station may transmit, to the channel engineering device, the first reference signal transmission based on the control signaling. The operations of 1610 may be performed according to the methods described herein. In some examples, aspects of the operations of 1610 may be performed by a reference signal component as described with reference to FIGS. 5 through 8.

At 1615, the base station may receive, based on the control signaling, at least one AoA measurement report that indicates the first AoA measurement, the second AoA measurement, or both. The operations of 1615 may be performed according to the methods described herein. In some examples, aspects of the operations of 1615 may be performed by a report component as described with reference to FIGS. 5 through 8.

At 1620, the base station may transmit, to the channel engineering device, a control message that indicates a beam shaping configuration based on the at least one AoA measurement report. The operations of 1620 may be performed according to the methods described herein. In some examples, aspects of the operations of 1620 may be performed by a beam shaping component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a channel engineering device, comprising: receiving, from a base station, control signaling triggering the channel engineering device to perform a first angle of arrival measurement for a first reference signal transmission by the base station and a second angle of arrival measurement for a second reference signal transmission by a UE; transmitting, based at least in part on the control signaling, at least one angle of arrival measurement report that indicates the first angle of arrival measurement, the second angle of arrival measurement, or both; and receiving a control message that indicates a beam shaping configuration based at least in part on the at least one angle of arrival measurement report.

Aspect 2: The method of aspect 1, further comprising: receiving, from the base station, the first reference signal transmission based at least in part on the control signaling; and performing the first angle of arrival measurement of the first reference signal transmission.

Aspect 3: The method of any of aspects 1 through 2, further comprising: receiving, from the UE, the second reference signal transmission based at least in part on the control signaling; and performing the second angle of arrival measurement of the second reference signal transmission.

Aspect 4: The method of any of aspects 1 through 3, wherein transmitting the at least one angle of arrival measurement report comprises: transmitting a first measurement report message indicating the first angle of arrival measurement; and transmitting a second measurement report message indicating the second angle of arrival measurement.

Aspect 5: The method of any of aspects 1 through 4, further comprising: receiving, from the base station, second control signaling triggering the channel engineering device to perform a third angle of arrival measurement for a third reference signal transmission by the UE; transmitting, based at least in part on the second control signaling, a second angle of arrival measurement report that indicates the third angle of arrival measurement; and receiving a second control message that indicates an updated beam shaping configuration based at least in part on the second angle of arrival measurement report.

Aspect 6: The method of any of aspects 1 through 5, wherein receiving the control signaling comprises: receiving the control signaling that configures the channel engineering device to monitor a reference signal transmission resource periodically or semi-statically for a subsequent reference signal transmission by the UE; and transmitting, based at least in part on the control signaling, an updated measurement reporting that indicates an updated angle of arrival measurement for each subsequent reference signal transmission by the UE.

Aspect 7: The method of any of aspects 1 through 6, wherein the beam shaping configuration indicates one or more settings to adjust an electronic metamaterial of the channel engineering device to focus received signal energy, reflect received signal energy, refract received signal energy, filter received signal energy, or any combination thereof.

Aspect 8: The method of any of aspects 1 through 7, wherein the first reference signal transmission is a channel state information reference signal and the second reference signal transmission is a sounding reference signal transmission.

Aspect 9: A method for wireless communications at a base station, comprising: transmitting, to a channel engineering device, control signaling triggering the channel engineering device to perform a first angle of arrival measurement for a first reference signal transmission by the base station and a second angle of arrival measurement for a second reference signal transmission by a UE; receiving, based at least in part on the control signaling, at least one angle of arrival measurement report that indicates the first angle of arrival measurement, the second angle of arrival measurement, or both; and transmitting, to the channel engineering device, a control message that indicates a beam shaping configuration based at least in part on the at least one angle of arrival measurement report.

Aspect 10: The method of aspect 9, further comprising: transmitting, to the channel engineering device, the first reference signal transmission based at least in part on the control signaling.

Aspect 11: The method of any of aspects 9 through 10, wherein receiving the at least one angle of arrival measurement report comprises: receiving a first measurement report message indicating the first angle of arrival measurement; and receiving a second measurement report message indicating the second angle of arrival measurement.

Aspect 12: The method of any of aspects 9 through 11, further comprising: transmitting, to the channel engineering device, second control signaling triggering the channel engineering device to perform a third angle of arrival measurement for a third reference signal transmission by the UE; receiving, based at least in part on the second control signaling, a second angle of arrival measurement report that indicates the third angle of arrival measurement; and transmitting, to the channel engineering device, a second control message that indicates an updated beam shaping configuration based at least in part on the second angle of arrival measurement report.

Aspect 13: The method of any of aspects 9 through 12, wherein transmitting the control signaling comprises: transmitting the control signaling that configures the channel engineering device to monitor a reference signal transmission resource periodically or semi-statically for a subsequent reference signal transmission by the UE.

Aspect 14: The method of aspect 13, further comprising: receiving, based at least in part on the control signaling, an updated measurement reporting that indicates an updated angle of arrival measurement for each subsequent reference signal transmission by the UE.

Aspect 15: The method of any of aspects 9 through 14, wherein the beam shaping configuration indicates one or more settings to adjust an electronic metamaterial of the channel engineering device to focus received signal energy, reflect received signal energy, refract received signal energy, filter received signal energy, or any combination thereof.

Aspect 16: The method of any of aspects 9 through 15, wherein the first reference signal transmission is a channel state information reference signal and the second reference signal transmission is a sounding reference signal transmission.

Aspect 17: An apparatus for wireless communications at a channel engineering device, comprising a processor; memory coupled with the processor; and instructions stored in the memory and executable by the processor to cause the apparatus to perform a method of any of aspects 1 through 8.

Aspect 18: An apparatus for wireless communications at a channel engineering device, comprising at least one means for performing a method of any of aspects 1 through 8.

Aspect 19: A non-transitory computer-readable medium storing code for wireless communications at a channel engineering device, the code comprising instructions executable by a processor to perform a method of any of aspects 1 through 8.

Aspect 20: An apparatus for wireless communications at a base station, comprising a processor; memory coupled with the processor; and instructions stored in the memory and executable by the processor to cause the apparatus to perform a method of any of aspects 9 through 16.

Aspect 21: An apparatus for wireless communications at a base station, comprising at least one means for performing a method of any of aspects 9 through 16.

Aspect 22: A non-transitory computer-readable medium storing code for wireless communications at a base station, the code comprising instructions executable by a processor to perform a method of any of aspects 9 through 16.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a channel engineering device, comprising:
   receiving, from a base station, control signaling triggering the channel engineering device to perform a first angle of arrival measurement for a first reference signal transmission by the base station and a second angle of arrival measurement for a second reference signal transmission by a user equipment (UE);
   transmitting, based at least in part on the control signaling, at least one angle of arrival measurement report that indicates the first angle of arrival measurement, the second angle of arrival measurement, or both; and
   receiving a control message that indicates a beam shaping configuration based at least in part on the at least one angle of arrival measurement report.

2. The method of claim 1, further comprising:
receiving, from the base station, the first reference signal transmission based at least in part on the control signaling; and
performing the first angle of arrival measurement of the first reference signal transmission.

3. The method of claim 1, further comprising:
receiving, from the UE, the second reference signal transmission based at least in part on the control signaling; and
performing the second angle of arrival measurement of the second reference signal transmission.

4. The method of claim 1, wherein transmitting the at least one angle of arrival measurement report comprises:
transmitting a first measurement report message indicating the first angle of arrival measurement; and
transmitting a second measurement report message indicating the second angle of arrival measurement.

5. The method of claim 1, further comprising:
receiving, from the base station, second control signaling triggering the channel engineering device to perform a third angle of arrival measurement for a third reference signal transmission by the UE;
transmitting, based at least in part on the second control signaling, a second angle of arrival measurement report that indicates the third angle of arrival measurement; and
receiving a second control message that indicates an updated beam shaping configuration based at least in part on the second angle of arrival measurement report.

6. The method of claim 1, wherein receiving the control signaling comprises:
receiving the control signaling that configures the channel engineering device to monitor a reference signal transmission resource periodically or semi-statically for a subsequent reference signal transmission by the UE; and
transmitting, based at least in part on the control signaling, an updated measurement reporting that indicates an updated angle of arrival measurement for each subsequent reference signal transmission by the UE.

7. The method of claim 1, wherein the beam shaping configuration indicates one or more settings to adjust an electronic metamaterial of the channel engineering device to focus received signal energy, reflect received signal energy, refract received signal energy, filter received signal energy, or any combination thereof.

8. The method of claim 1, wherein the first reference signal transmission is a channel state information reference signal and the second reference signal transmission is a sounding reference signal transmission.

9. A method for wireless communications at a base station, comprising:
transmitting, to a channel engineering device, control signaling triggering the channel engineering device to perform a first angle of arrival measurement for a first reference signal transmission by the base station and a second angle of arrival measurement for a second reference signal transmission by a user equipment (UE);
receiving, based at least in part on the control signaling, at least one angle of arrival measurement report that indicates the first angle of arrival measurement, the second angle of arrival measurement, or both; and
transmitting, to the channel engineering device, a control message that indicates a beam shaping configuration based at least in part on the at least one angle of arrival measurement report.

10. The method of claim 9, further comprising:
transmitting, to the channel engineering device, the first reference signal transmission based at least in part on the control signaling.

11. The method of claim 9, wherein receiving the at least one angle of arrival measurement report comprises:
receiving a first measurement report message indicating the first angle of arrival measurement; and
receiving a second measurement report message indicating the second angle of arrival measurement.

12. The method of claim 9, further comprising:
transmitting, to the channel engineering device, second control signaling triggering the channel engineering device to perform a third angle of arrival measurement for a third reference signal transmission by the UE;
receiving, based at least in part on the second control signaling, a second angle of arrival measurement report that indicates the third angle of arrival measurement; and
transmitting, to the channel engineering device, a second control message that indicates an updated beam shaping configuration based at least in part on the second angle of arrival measurement report.

13. The method of claim 9, wherein transmitting the control signaling comprises:
transmitting the control signaling that configures the channel engineering device to monitor a reference signal transmission resource periodically or semi-statically for a subsequent reference signal transmission by the UE.

14. The method of claim 13, further comprising:
receiving, based at least in part on the control signaling, an updated measurement reporting that indicates an updated angle of arrival measurement for each subsequent reference signal transmission by the UE.

15. The method of claim 9, wherein the beam shaping configuration indicates one or more settings to adjust an electronic metamaterial of the channel engineering device to focus received signal energy, reflect received signal energy, refract received signal energy, filter received signal energy, or any combination thereof.

16. The method of claim 9, wherein the first reference signal transmission is a channel state information reference signal and the second reference signal transmission is a sounding reference signal transmission.

17. An apparatus for wireless communications at a channel engineering device, comprising:
a processor;
memory coupled with the processor; and
instructions stored in the memory and executable by the processor to cause the apparatus to:
receive, from a base station, control signaling triggering the channel engineering device to perform a first angle of arrival measurement for a first reference signal transmission by the base station and a second angle of arrival measurement for a second reference signal transmission by a user equipment (UE);
transmit, based at least in part on the control signaling, at least one angle of arrival measurement report that indicates the first angle of arrival measurement, the second angle of arrival measurement, or both; and receive a control message that indicates a beam shaping configuration based at least in part on the at least one angle of arrival measurement report.

18. The apparatus of claim 17, wherein the instructions are further executable by the processor to cause the apparatus to:
receive, from the base station, the first reference signal transmission based at least in part on the control signaling; and
perform the first angle of arrival measurement of the first reference signal transmission.

19. The apparatus of claim 17, wherein the instructions are further executable by the processor to cause the apparatus to:
receive, from the UE, the second reference signal transmission based at least in part on the control signaling; and
perform the second angle of arrival measurement of the second reference signal transmission.

20. The apparatus of claim 17, wherein the instructions to transmit the at least one angle of arrival measurement report are executable by the processor to cause the apparatus to:
transmit a first measurement report message indicating the first angle of arrival measurement; and
transmit a second measurement report message indicating the second angle of arrival measurement.

21. The apparatus of claim 17, wherein the instructions are further executable by the processor to cause the apparatus to:
receive, from the base station, second control signaling triggering the channel engineering device to perform a third angle of arrival measurement for a third reference signal transmission by the UE;
transmit, based at least in part on the second control signaling, a second angle of arrival measurement report that indicates the third angle of arrival measurement; and
receive a second control message that indicates an updated beam shaping configuration based at least in part on the second angle of arrival measurement report.

22. The apparatus of claim 17, wherein the instructions to receive the control signaling are executable by the processor to cause the apparatus to:
receive the control signaling that configures the channel engineering device to monitor a reference signal transmission resource periodically or semi-statically for a subsequent reference signal transmission by the UE; and
transmit, based at least in part on the control signaling, an updated measurement reporting that indicates an updated angle of arrival measurement for each subsequent reference signal transmission by the UE.

23. The apparatus of claim 17, wherein the beam shaping configuration indicates one or more settings to adjust an electronic metamaterial of the channel engineering device to focus received signal energy, reflect received signal energy, refract received signal energy, filter received signal energy, or any combination thereof.

24. The apparatus of claim 17, wherein the first reference signal transmission is a channel state information reference signal and the second reference signal transmission is a sounding reference signal transmission.

25. An apparatus for wireless communications at a base station, comprising:
a processor,
memory coupled with the processor; and
instructions stored in the memory and executable by the processor to cause the apparatus to:
transmit, to a channel engineering device, control signaling triggering the channel engineering device to perform a first angle of arrival measurement for a first reference signal transmission by the base station and a second angle of arrival measurement for a second reference signal transmission by a user equipment (UE);
receive, based at least in part on the control signaling, at least one angle of arrival measurement report that indicates the first angle of arrival measurement, the second angle of arrival measurement, or both; and
transmit, to the channel engineering device, a control message that indicates a beam shaping configuration based at least in part on the at least one angle of arrival measurement report.

26. The apparatus of claim 25, further comprising a transmitter, wherein the instructions are further executable by the processor to cause the apparatus to:
transmit, to the channel engineering device via the transmitter, the first reference signal transmission based at least in part on the control signaling.

27. The apparatus of claim 25, wherein the instructions to receive the at least one angle of arrival measurement report are executable by the processor to cause the apparatus to:
receive a first measurement report message indicating the first angle of arrival measurement; and
receive a second measurement report message indicating the second angle of arrival measurement.

28. The apparatus of claim 25, wherein the instructions are further executable by the processor to cause the apparatus to:
transmit, to the channel engineering device, second control signaling triggering the channel engineering device to perform a third angle of arrival measurement for a third reference signal transmission by the UE;
receive, based at least in part on the second control signaling, a second angle of arrival measurement report that indicates the third angle of arrival measurement; and
transmit, to the channel engineering device, a second control message that indicates an updated beam shaping configuration based at least in part on the second angle of arrival measurement report.

29. The apparatus of claim 25, wherein the instructions to transmit the control signaling are executable by the processor to cause the apparatus to:
transmit the control signaling that configures the channel engineering device to monitor a reference signal transmission resource periodically or semi-statically for a subsequent reference signal transmission by the UE.

30. The apparatus of claim 29, wherein the instructions are further executable by the processor to cause the apparatus to:
receive, based at least in part on the control signaling, an updated measurement reporting that indicates an updated angle of arrival measurement for each subsequent reference signal transmission by the UE.

* * * * *